(12) United States Patent
Calmon et al.

(10) Patent No.: US 11,146,504 B2
(45) Date of Patent: Oct. 12, 2021

(54) MARKET-BASED DISTRIBUTED RESOURCE ALLOCATION FOR EDGE-CLOUD SYSTEMS

(71) Applicant: EMC IP Holding Company LLC, Hopkinton, MA (US)

(72) Inventors: Tiago Salviano Calmon, Rio de Janeiro (BR); Ana Cristina Bernardo de Oliveira, Rio de Janeiro (BR); Flavia Coimbra Delicato, Rio de Janeiro (BR); Paulo F. Pires, Lagoa (BR); Tiago Cariolano de Souza Xavier, Rio de Janeiro (BR); Igor Leão dos Santos, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 16/429,514

(22) Filed: Jun. 3, 2019

(65) Prior Publication Data

US 2020/0382445 A1 Dec. 3, 2020

(51) Int. Cl.
*H04L 12/911* (2013.01)
*H04L 29/08* (2006.01)

(52) U.S. Cl.
CPC .......... *H04L 47/827* (2013.01); *H04L 47/821* (2013.01); *H04L 67/10* (2013.01); *H04L 67/12* (2013.01)

(58) Field of Classification Search
CPC . H04L 67/1012; H04L 47/827; H04L 47/821; H04L 67/10; H04L 67/12;
(Continued)

(56) References Cited

U.S. PATENT DOCUMENTS 10,191,778 B1\* 1/2019 Yang .................. G06Q 30/0283
10,218,776 B2\* 2/2019 Llorca ........................ G06F 9/50
(Continued)

OTHER PUBLICATIONS

Internet of Things: Survey, Aztori et al (pp. 1-19), May 31, 2010 (Year: 2010).\*
(Continued)

*Primary Examiner* — Javier O Guzman
(74) *Attorney, Agent, or Firm* — Ryan, Mason & Lewis, LLP

(57) ABSTRACT

Market-based distributed resource allocation techniques are provided for edge-cloud systems. One method comprises obtaining an application request at a given edge node in a multi-tier environment comprising cloud resources and multiple edge nodes. The edge nodes host a plurality of virtual nodes to process the application request. The application request is assigned to at least one of the virtual nodes based on a utility value of each virtual node. The utility value of each virtual node is based on a cost value representing a total cost incurred by each virtual node to process the application request. The utility value of each virtual node is optionally further based on a priority value of the application request. Master nodes from different edge node groups can collaborate to identify a given edge node group that can serve the application request when local edge nodes are unable to process the at least one application request.

20 Claims, 8 Drawing Sheets

(58) Field of Classification Search
CPC ............. H04L 41/5051; H04L 41/0816; H04L 41/5096; H04L 41/0803; H04L 47/823; H04L 47/788; G06F 9/45558; G06F 2009/4557; G06F 9/5077; G06F 9/5055; G06F 2009/45595

See application file for complete search history.

(56) References Cited

U.S. PATENT DOCUMENTS

| | | | | |
|---|---|---|---|---|
| 10,412,118 | B1* | 9/2019 | Davis | H04L 63/20 |
| 10,467,042 | B1* | 11/2019 | Mercier | G06F 8/60 |
| 2002/0055989 | A1* | 5/2002 | Stringer-Calvert | H04L 29/06 709/220 |
| 2004/0153567 | A1* | 8/2004 | Lichtenstein | H04L 67/322 709/235 |
| 2006/0106894 | A1* | 5/2006 | Richardson | G06F 16/273 |
| 2014/0223444 | A1* | 8/2014 | Keeton | G06F 9/50 718/104 |
| 2016/0013985 | A1* | 1/2016 | Reddy | H04L 41/5003 726/4 |
| 2016/0105489 | A1* | 4/2016 | Llorca | G06F 9/50 709/226 |
| 2017/0048308 | A1* | 2/2017 | Qaisar | H04L 67/12 |
| 2019/0075184 | A1* | 3/2019 | Seed, IV | H04L 67/2852 |
| 2019/0097900 | A1* | 3/2019 | Rodriguez | H04L 41/5054 |
| 2019/0101903 | A1* | 4/2019 | Katti | G05B 19/4188 |
| 2019/0319861 | A1* | 10/2019 | Pan | H04L 9/0637 |
| 2020/0351900 | A1* | 11/2020 | Zhang | H04L 12/14 |

OTHER PUBLICATIONS

Agirre et al.,2016. "QoS Aware Middleware Support for Dynamically Reconfigurable Component Based IoT Applications," Int. J. Distrib. Sen. Netw. 2016, pages. DOI=http://dx.doi.org/10.1155/2016/2702789.

Botta et al., "Integration of Cloud computing and Internet of Things: A survey," Future Generation Computer Systems, vol. 56, 2016, pp. 684-700, ISSN 0167-739X, https://doi.org/10.1016/j.future.2015.09.021.

Billet et al., "From Task Graphs to Concrete Actions: A New Task Mapping Algorithm for the Future Internet of Things," 2014 IEEE 11th International Conference on Mobile Ad Hoc and Sensor Systems, Philadelphia, PA, 2014, pp. 470-478. doi: 10.1109/MASS.2014.20.

Wong et al., "A low complexity algorithm for proportional resource allocation in OFDMA systems," IEEE Workshop onSignal Processing Systems, 2004. SIPS 2004., Austin, TX, 2004, pp. 1-6. doi: 10.1109/SIPS.2004.1363015.

Chang et al., "Internet of Things and Cloud Computing for Future Internet," In: Chang RS., Kim T., Peng SL. (eds) Security-Enriched Urban Computing and Smart Grid. SUComS 201t Communications in Computer and Information Science, vol. 223. Springer, Berlin, Heidelberg.

Delgado et al., "On optimal resource allocation in virtual sensor networks," Ad Hoc Netw. 50, C (Nov. 2016), 23-40. DOI: http://dx.doi.org/10.1016/j.adhoc.2016.04.004.

Bonomi et al., "Fog computing and its role in the internet of things," In Proceedings of the first edition of the MCC workshop on Mobile cloud computing (MCC '12). ACM, New York, NY, USA, 13-16. DOI=http://dx.doi.org/10.1145/2342509.2342513.

Takalo-Mattila et al., "Architecture for mixed criticality resource management in Internet of Things," Proceedings of 2014 TRON Symposium (TRONSHOW), Tokyo, 2014, pp. 1-9.

Zhang et al., "Resource provision algorithms in cloud computing: A survey," J. Netw. Comput. Appl. 64 (2016) 23-42. doi:10.1016/j.jnca.2015.12.018.

Li et al., "QoS-aware scheduling of services-oriented internet of things," IEEE Transactions on Industrial Informatics 10(2):1497-1505.

Jennings et al., "Resource management in clouds: Survey and research challenges," Journal of Network and Systems Management 23 (3):567-619 (2015).

Zhou et al., "CloudThings: A common architecture for integrating the Internet of Things with Cloud Computing," Proceedings of the 2013 IEEE 17th International Conference on Computer Supported Cooperative Work in Design (CSCWD), Whistler, BC, 2013, pp. 651-657. doi: 10.1109/CSCWD.2013.6581037.

Shi et al., "Edge computing: Vision and challenges," IEEE Internet of Things Journal, 3(5), 637-646 (2016).

Satyanarayanan et al., "The Case for VM-Based Cloudlets in Mobile Computing," in IEEE Pervasive Computing, vol. 8, No. 4, pp. 14-23, Oct.-Dec. 2009. doi: 10.1109/MPRV.2009.82.

Mahmud et al., "Fog computing: A taxonomy, survey and future directions," In Internet of Everything (pp. 103-130). Springer, Singapore (2018).

Mokrane Bouzeghoub, "A framework for analysis of data freshness," In Proceedings of the 2004 international workshop on Information quality in information systems (IQIS '04). ACM, New York, NY, USA, 59-67. DOI=http://dx.doi.org/10.1145/1012453.1012464(2004).

Marti et al., "Heuristic Methods," in: Eur. J. Oper. Res., 2011: pp. 17-40. doi:10.1007/978-3-642-16729-4_2.

Bolaños et al., "A multiobjective non-dominated sorting genetic algorithm (NSGA-II) for the Multiple Traveling Salesman Problem," Decis. Sci. Lett 4 (2015) 559-568. doi:10.5267/j.dsl.2015.5.003.

Ruoshui et al., "Opportunities and challenges of wireless sensor networks using cloud services," In Proceedings of the workshop on Internet of Things and Service Platforms (IoTSP '11). ACM, New York, NY, USA, Article 4 , 7 pages. DOI=http://dx.doi.org/10.1145/2079353.2079357 (2011).

U.S. Appl. No. 16/401,604 entitled, "Resource Allocation and Provisioning in a Multi-Tier Edge-Cloud Virtualization Environment", filed May 2, 2019.

* cited by examiner

| | MARKET-BASED RESOURCE ALLOCATION ALGORITHM |
|---|---|
| 1 | while *true* do |
| 2 |    event ← receiveEvent(); |
| 3 |    if *event.type = REQUEST_ARRIVED* then |
| 4 |       $r_k$ ← (Request)event.message; |
| 5 |       bestVN ← search_best_vn_locally $(r_k)$; |
| 6 |       if *bestVN is found* then |
| 7 |          $v_j$ ← bestVN; |
| 8 |          allocate $(v_j, r_k)$ |
| 9 |       else |
| 10 |          bestSlave = search_possible_vn_slave $(r_k)$; |
| 11 |          if *bestSlave is found* then |
| 12 |             foward_request (bestSlave, $r_k$); |
| 13 |          else |
| 14 |             if $r_{e_i} = MASTER$ then |
| 15 |                bestMaster = search_possible_vn_master $(r_k)$; |
| 16 |                if *bestMaster is found* then |
| 17 |                   forward_request (bestMaster, $r_k$) |
| 18 |                else |
| 19 |                   forward_request (cloud) |
| 20 |                end |
| 21 |             end |
| 22 |             if $r_{e_i} = SLAVE$ then |
| 23 |                parent = search_possible_vn_parent $(r_k)$; |
| 24 |                foward_request (parent, $r_k$) |
| 25 |             end |
| 26 |          end |
| 27 |       end |
| 28 |    end |
| 29 |    if *event.type = VN_FINISHED* then |
| 30 |       $v_j$ ← (VN) event.message; |
| 31 |       update_resources $(v_j)$ |
| 32 |    end |
| 33 | end |

FIG. 5

MARKET-BASED DISTRIBUTED RESOURCE ALLOCATION FOR EDGE-CLOUD SYSTEMS

FIELD

The field relates generally to resource allocation techniques in information processing systems.

BACKGROUND

In spite of the potential benefits that cloud platforms can bring to the Internet of Things (IoT), by acting as backend systems, the essentially centralized nature of the cloud does not fit well with the inherently decentralized nature of IoT. Moreover, the unpredictable and frequently high delay of communications with the cloud may not be suitable to meet the requirements of time critical IoT applications. Support for decentralized data processing on IoT devices and other devices near the edge of the network, in combination with the benefits of cloud technologies, has been identified as a promising approach to reduce communication overhead and data transfer time (hence the latency for applications).

In this context, the conceptual approach known as Fog or Edge Computing has recently emerged, aiming at moving part of the computing and storage resources closer to the edge of the network, in a decentralized way. The combination of IoT devices, edge nodes and cloud backend platforms gives rise to a three-tier architecture for IoT ecosystems, with devices of each tier in charge of different responsibilities and providing different types of services. In these complex and dynamic ecosystems, a key issue is how to efficiently and effectively allocate available resources to meet the demands of the applications in a satisfactory way. The goal of resource allocation in IoT-Edge-Cloud systems is to maximize the amount of application requirements met by the infrastructure, while ensuring a target operational cost (in a similar manner as a traditional cloud environment). However, the decentralized nature, the specific requirements of the applications, and the heterogeneity of the devices, require tailored solutions for such environments.

A need remains for improved resource allocation techniques for such IoT-edge-cloud systems.

SUMMARY

In one embodiment, a method comprises obtaining at least one application request at a given edge node in a multi-tier environment comprising one or more cloud resources and a plurality of edge nodes including the given edge node, wherein the plurality of edge nodes host a plurality of virtual nodes to process the at least one application request; assigning the at least one application request to at least one of the plurality of virtual nodes based on a utility value of each of the virtual nodes, wherein the utility value of each virtual node is based on a cost value representing a total cost incurred by each virtual node to process the at least one application request; and providing the at least one application request to the at least one virtual node based on the assigning, wherein the at least one virtual node provides data in response to the at least one application request to one or more of: at least one corresponding application and one or more additional virtual nodes. In some embodiments, the utility value of each virtual node is further based on a priority value of the at least one application request.

In at least one embodiment, the at least one application request is forwarded to at least one different edge node if the given edge node does not satisfy the at least one application request. The at least one different edge node returns a corresponding utility value to the given edge node in some embodiments, and the given edge node forwards the at least one application request to the different edge node having a substantially highest utility value.

In one or more embodiments, the edge nodes are grouped into a plurality of edge node groups and each edge node group comprises at least one master node. At least two master nodes from different edge node groups collaborate in some embodiments to identify a given edge node group that can serve the at least one application request when each of the at least one different edge node is unable to process the at least one application request.

Other illustrative embodiments include, without limitation, apparatus, systems, methods and computer program products comprising processor-readable storage media.

BRIEF DESCRIPTION OF THE DRAWINGS

FIG. 5 illustrates pseudo code for an exemplary implementation of the market-based resource allocation process of FIG. 4, according to one or more embodiments;

DETAILED DESCRIPTION

Figure 1:
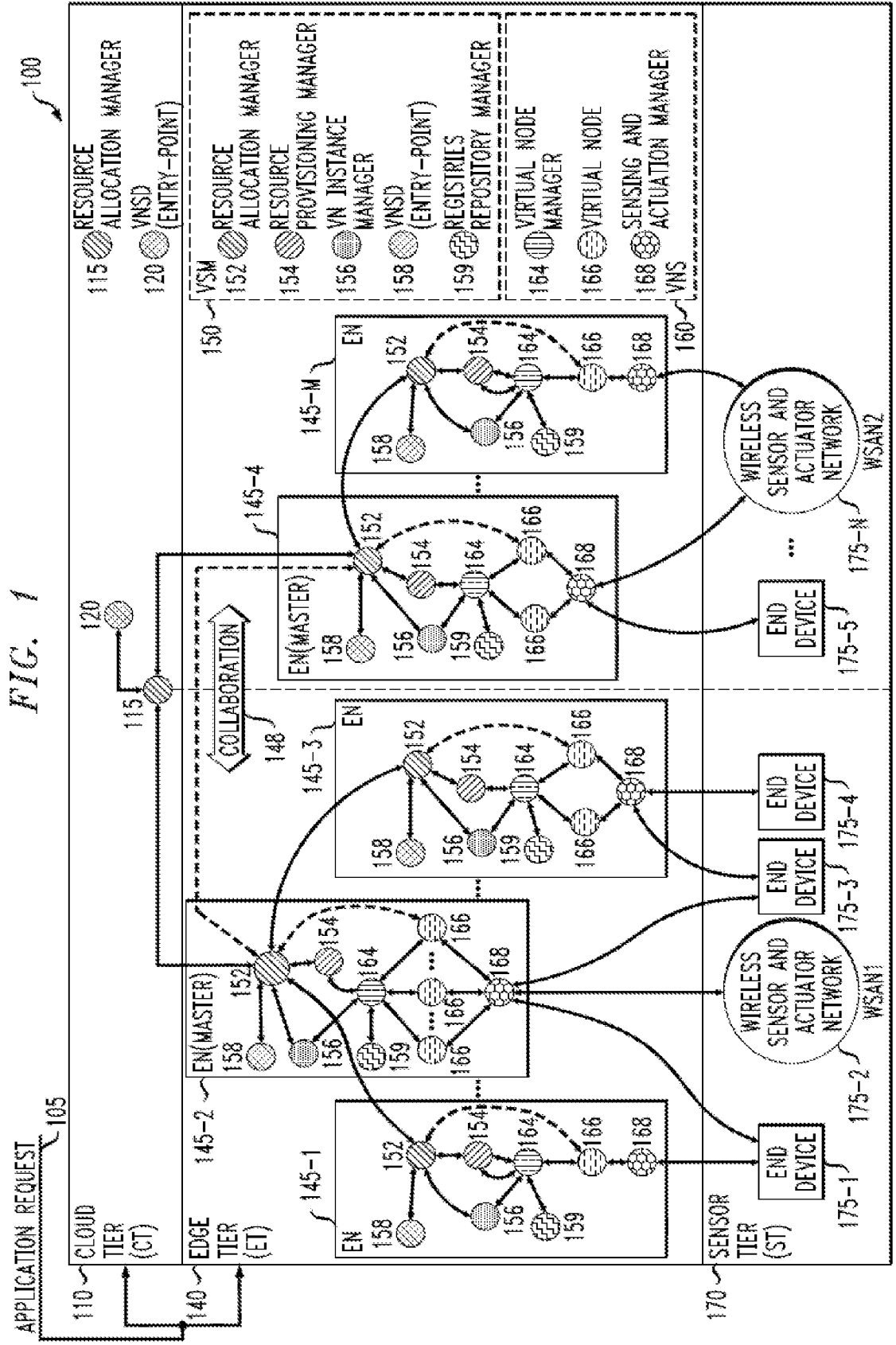
FIG. 1 illustrates an exemplary three-tier architecture in which one or more aspects of the disclosed resource management framework may be implemented for processing one or more application requests, according to at least one embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for market-based distributed resource allocation for edge-cloud systems.

In one or more embodiments, resource allocation techniques are provided for edge-cloud systems that (i) support heterogeneity of devices and applications, and (ii) leverage the distributed nature of edge nodes to promote collaboration during the allocation process. As there are already numerous resource allocation algorithms specific to the cloud tier, some embodiments of the disclosed techniques solve the allocation problem in the edge tier. The disclosed algorithm aims to provide an efficient usage of the system resources while meeting latency requirements of emergent applications. To compensate for the scarce amount of resources of edge devices (in comparison with cloud data centres), the disclosed solution divides the application workload between a set of devices, which cooperate to achieve the desired goals.

The IoT paradigm builds on the dynamic interconnection of intelligent and autonomous objects in order to extend the current Internet to the physical realm. The IoT paradigm represents one of the most disruptive technologies, enabling truly ubiquitous and pervasive computing scenarios. See, for example, Alessio Botta et al., "Integration of Cloud Computing and Internet of Things: A Survey," Future Generation Computer Systems, Vol. 56, 684-700 (2016, ISSN 0167-739X), incorporated by reference herein in its entirety. Various types of devices, with intrinsically heterogeneous features make up the IoT, giving rise to a complex ecosystem. In general, data producers in the IoT environment consist of objects (e.g., things) often instrumented by sensors, capable of capturing several types of environmental variables. In addition, such devices are endowed with embedded processors and storage units and often also have interfaces for wireless communication. Physical entities that act as IoT data sources are characterized by limited resources (regarding, for example, processing, storage and energy). Therefore, complex processing tasks or permanent storage of the data generated by IoT devices in general cannot be performed on the data-producing devices themselves. In this context, cloud computing platforms, with their virtually unlimited capabilities in terms of storage and processing power, are promising solutions as backend for IoT systems. Thus, a new IT paradigm, in which Cloud and IoT are two complementary technologies merged together, is expected to disrupt both current and future Internet. See, for example, Jiehan Zhou et al., "CloudThings: A Common Architecture for integrating the Internet of Things with Cloud Computing," Proc. of the 2013 IEEE 17th International Conference on Computer Supported Cooperative Work in Design (CSCWD), 651-57 (Whistler, BC, 2013); and/or K. D. Chang, "Internet of Things and Cloud Computing for Future Internet," in R S Chang et al. (eds.), Security-Enriched Urban Computing and Smart Grid (SU-ComS 2011), Communications in Computer and Information Science, Vol 223. (Springer, Berlin, Heidelberg, 2011), each incorporated by reference herein in its entirety.

In spite of the potential benefits of Cloud platforms as IoT backend systems, however, the essentially centralized nature of the cloud environment does not fit well with the inherently decentralized nature of IoT. In IoT, data is often generated from geographically distributed sources, and can be consumed by equally dispersed users, often using devices that themselves are also part of IoT. Blindly sending IoT data for processing and storage centrally in the cloud, and then forwarding the data back to users near the data sources, can result in intolerable delays. For some applications, response time is a critical requirement, and the latency and unpredictability of communications with the cloud can lead to performance degradation. In addition, many IoT devices have non-negligible computational capabilities, which can be exploited opportunistically to perform distributed and location-aware processing.

Support for decentralized data processing on IoT devices and other devices near the edge of the network, in combination with the benefits of cloud technologies, has been identified as a promising approach to reduce communication overhead and data transfer time (hence the latency for applications). In this context, the conceptual approach known as Fog or Edge Computing (see, for example, R. Mahmud et al., Fog Computing: A Taxonomy, Survey and Future Directions, in Internet of Everything, 103-130 (Springer, Singapore; 2018); and W. Shi et al., "Edge Computing: Vision and Challenges," IEEE Internet of Things Journal, 3(5), 637-46 (2016), respectively, each incorporated by reference herein in its entirety) has recently emerged, aiming at moving part of the computing and storage resources closer to the edge of the network, in a decentralized way. The combination of IoT devices, edge nodes and cloud backend platforms gives rise to a three-tier architecture for IoT ecosystems, with devices of each tier in charge of different responsibilities and providing different types of services.

Physical devices located at the edge tier are heterogeneous in terms of their capabilities and can be either resource-poor devices such as access points, smart routers, switches, base stations, and smart sensors, or resource-rich machines like a "cloud-in-a-box", or Cloudlets. See, for example, M. Satyanarayanan et al., "The Case for VM-Based Cloudlets in Mobile Computing," IEEE Pervasive Computing, Vol. 8, No. 4, 14-23 (October-December 2009), incorporated by reference herein in its entirety. Edge devices consume locally the portion of data generated by sensors that require real-time processing (from milliseconds to tenths of seconds). Then, they eventually transmit the rest of such data to the cloud, for operations with less stringent time constraints (from seconds to minutes). Therefore, edge computing allows real-time delivery of data, especially for latency sensitive services. On the other hand, the closer to the cloud, the longer the time scale, and the wider is the geographical coverage. The cloud provides the ultimate and global coverage and serves as a repository for data for a duration of months or years, besides allowing more complex data analytics, based on historical data.

Both cloud and edge computing strongly rely on the virtualization concept. See, for example, Flavio Bonomi et al., "Fog Computing and its Role in the Internet of Things," Proc. of the First Edition of the MCC workshop on Mobile Cloud Computing (MCC '12), 13-16 (ACM, New York, N.Y., USA, 2012), incorporated by reference herein in its entirety.

Ruoshui Liu and Ian J. Wassell, "Opportunities and Challenges of Wireless Sensor Networks Using Cloud Services," Proc. of the Workshop on Internet of Things and Service Platforms (IoTSP '11) (ACM, New York, N.Y., USA; 2011), incorporated by reference herein in its entirety, defines virtualization in terms of hiding from consumers of services the variety of types of infrastructures, platforms and data available at the backend, facilitating application delivery and allowing resource sharing among applications. The virtualization process maps one or more physical resources to one or more virtual resources to be provided as services to client applications. Considering the resource limitation of edge devices, compared to the cloud data centers, the current literature envisions a trend towards using lightweight virtualization technologies at this tier. By employing a light virtualization model, a set of virtual nodes (for instance, implemented as containers) is made available to applications, providing a clean decoupling between the physical infrastructure and applications. Assigning such virtual nodes to application requests in a timely and efficient way rises the challenge of resource allocation.

Similar to traditional clouds, the goal of resource allocation in IoT-Edge-Cloud systems is to substantially maximize the amount of application requirements met by the infrastructure, while ensuring a target operational cost. However, the decentralized nature, the specific requirements of the applications, and the heterogeneity of the devices, require tailored solutions for such environments.

In one or more embodiments, a resource allocation algorithm is provided for IoT-edge-cloud systems that (i) supports heterogeneity of devices and applications, and (ii) leverages the distributed nature of edge nodes to promote collaboration during the allocation process. As there are already numerous resource allocation algorithms specific to the cloud tier, one or more aspects of the disclosure address the allocation problem in the edge tier. In some embodiments, the disclosed algorithm provides an efficient usage of the system resources while meeting latency requirements of emergent applications. To compensate for the scarce amount of resources of edge devices (in comparison with cloud data centres), the disclosed solution divides the application workload between a set of devices, which cooperate to achieve the desired goals.

The high heterogeneity and dynamism of IoT-Edge-Cloud Systems make resource allocation in such an environment a complex and challenging task, that requires improved solutions to design a resource allocation system and algorithms tailored to such a scenario. These systems and algorithms need to deal with unpredictable requests from applications in an elastic and transparent way and leverage the diverse nature and opportunistic offer of resources. This elasticity should allow the dynamic use of physical resources, avoiding both the under-provisioning and overprovisioning of resources. As mentioned above, the resource allocation activity aims to ensure the proper meeting of application requirements by the infrastructure, while minimizing its operational cost. Additional goals include: load balancing, whereby resources should be allocated in a manner so that utilization is balanced across all resources of a particular type; and fault tolerance, whereby resources are allocated in a manner such that the impact of a failure of individual components does not compromise the overall system performance, among others. See, for example, B. Jennings and R. Stadler, "Resource Management in Clouds: Survey and Research Challenges," Journal of Network and Systems Management 23(3), 567-619 (2015), incorporated by reference herein in its entirety.

Complexity of the Allocation Problem in Edge-Cloud Systems

Considering the dynamicity of the scenario and the different requirements of several concurrent applications accessing the system, it is therefore clear that building algorithms for resource allocation is not a trivial issue. Resource Allocation is typically modelled as an optimization problem, and multiple techniques have been employed to solve it, pursuing different performance goals and meeting different constraints. In particular, the problem of resource allocation in IoT-Edge-Cloud Systems falls within the typical class of mixed integer non-linear programming problems (MINLP). See, for example, R. I. Bolaños et al., "A Multi-Objective Non-Dominated Sorting Genetic Algorithm (NSGA-II) for the Multiple Traveling Salesman Problem," Decis. Sci. Lett. 4, 559-68 (2015); and/or Prasad Raghavendra, "Approximating NP-Hard Problems Efficient Algorithms and Their Limits, PhD Thesis, University of Washington, ProQuest Dissertations Publishing (3377316, 2009), each incorporated by reference herein in its entirety. To solve the MINLP in order to seek the optimal solution, there are a number of methods in the literature. See, for example, R. J. Vanderbei, "Linear Programming: Foundations and Extensions," Journal of the Operational Research Society, 49, 94-94 (1998), incorporated by reference herein in its entirety.

However, finding optimal solutions to MINLP is an NP-complete problem. See, for example, Carmen Delgado et al., "On Optimal Resource Allocation in Virtual Sensor Networks," Ad Hoc Netw. 50, C 23-40 (November 2016), incorporated by reference herein in its entirety. In addition, the explosive combinatorial nature of MINLP hinders the quick search for optimal solutions when it grows, in terms of the number of virtual nodes providing services and applications issuing requests. This aspect harms the delay-sensitive applications typical of the IoT scenario, which usually require strict response times, in the order of milliseconds to sub seconds. See, for example, K. D. Chang et al., "Internet of Things and Cloud Computing for Future Internet," in R. S. Chang et al., (eds) Security-Enriched Urban Computing and Smart Grid (SUComS 2011), Communications in Computer and Information Science, Vol 223, (Springer, Berlin, Heidelberg; 2011), incorporated by reference herein in its entirety. In this sense, another challenge arises regarding how to solve, in polynomial time, practical instances of the MINLP with arbitrary sizes. See, C. H. Papadimitriou, Computational Complexity (Reading, Mass.; Addison-Wesley, 2005), incorporated by reference herein in its entirety.

To deal with NP-complete problems, an entire research area exists that investigates and proposes quick search of solutions, emphasizing heuristic techniques that produce near-optimal solutions, and show low computation overhead. See, for example, I. C. Wong et al., "A Low Complexity Algorithm for Proportional Resource Allocation in OFDMA Systems," IEEE Workshop on Signal Processing Systems, SIPS 2004, 1-6 (Austin, Tex., 2004); J. Zhang et al., "Resource Provision Algorithms in Cloud Computing: A Survey," J. Netw. Comput. Appl. 64, 23-42 (2016); and/or R. Marti and G. Reinelt, "Heuristic Methods," in Eur. J. Oper. Res., 17-40 (2011), each incorporated by reference herein in its entirety.

Scale and Heterogeneity of Edge Nodes

Physical devices located at the edge tier are heterogeneous in terms of their capabilities and can be either resource-poor devices such as access points, smart routers, switches, base stations, and smart sensors, or resource-rich machines like a "cloud-in-a-box", or Cloudlets. The heterogeneity of the edge tier combined with the Internet scale of the Edge-cloud ecosystem gives birth to a complex environment. Such an ultra-large-scale system brings several challenges mainly regarding the coordination of the nodes actively engaged in providing the required resources to meet the application requests. One or more aspects of the disclosure have recognized a considerable deficiency in current works in the area of edge computing with respect to the lack of support for collaborative computation.

Heterogeneity of Applications' Quality of Service (QoS) Requirements

In addition to the high heterogeneity of devices at the edge tier, multiple applications with different non-functional (QoS-related) requirements can co-exist using resources from the same underlying infrastructure. There is still no consensus on the definition of quality of services in IoT, this being an open research issue that has been exploited by some recent works and proposals. See, Jiehan Zhou et al., "Cloud-Things: A Common Architecture for Integrating the Internet of Things with Cloud Computing," Proc. of the 2013 IEEE 17th International Conference on Computer Supported Cooperative Work in Design (CSCWD), 651-657 (Whistler, BC, 2013); Aitor Agirre et al., "QoS Aware Middleware Support for Dynamically Reconfigurable Component Based IoT Applications," Int. J. Distrib. Sen. Netw. (2016); L. Li et al., QoS-Aware Scheduling of Services-Oriented Internet of Things," IEEE Transactions on Industrial Informatics 10(2), 1497-1505 (2014); and/or J. Takalo-Mattila et al., "Architecture for Mixed Criticality Resource Management in Internet of Things," in TRON Symposium (TRONSHOW), 1-9 (2014), each incorporated by reference herein in its entirety.

QoS requirements traditionally used in computer networks are not enough for IoT systems. These general requirements mainly relate to network characteristics, such as bandwidth, delay or jitter, which are only part of the QoS problem to be managed in IoT. Requirements in the IoT domain need to be addressed with a multi-level approach encompassing both the infrastructure level (network and processing nodes) and the application level. Among relevant QoS parameters, latency (network level parameter) is considered by most as a primer requirement. Indeed, time critical applications demand more resources from the system and the allocation strategy needs to employ fast algorithms to properly meet them. Another important QoS requirement in IoT systems consists in the data freshness, given its importance for distributed systems based on sensing data. There are several definitions of data freshness in the literature (see, e.g., Mokrane Bouzeghoub, "A Framework for Analysis of Data Freshness," Proc. of the 2004 International Workshop on Information Quality in Information Systems (IQIS '04), 59-67 (ACM, New York, N.Y., USA, 2004), incorporated by reference herein), but it can be defined as the time elapsed since the data acquisition until its effective usage. However, when designing an IoT-Edge-Cloud system, an important issue while properly choosing the relevant QoS requirements to be considered concerns managing the simultaneous satisfaction of their requirements and considering the various priorities, or criticality of applications. An application that monitors the vital signs of a patient, or a fire detection application, for example, is more critical than an application that only enhances the comfort of the users. Applications with the highest level of criticality typically need to have their requirements met with a highest priority. Therefore, solutions for resource allocation in IoT provide mechanisms to represent the priorities of the applications and to ensure that these priorities are respected when making the task scheduling.

As noted above, market-based distributed resource allocation techniques are provided for IoT-edge-cloud systems.

System Architecture

FIG. 1 illustrates an exemplary three-tier architecture 100 in which one or more aspects of the disclosed resource management framework may be implemented for processing one or more application requests 105, according to at least one embodiment. The disclosed exemplary lightweight data-centric model uses a set of different techniques for the creation of virtual nodes. In some embodiments, six built-in, predefined types of virtual nodes are initially provided, as discussed further below in conjunction with FIG. 2.

As shown in FIG. 1, the exemplary three-tier architecture 100 is comprised of three tiers: (i) a Cloud tier (CT) 110, (ii) an Edge tier (ET) 140, and (iii) a Sensor (or data source) tier (ST) 170. The CT 110 comprises a plurality of cloud nodes (CN) (not shown in FIG. 1), and the ET 140 comprises a plurality of edge nodes (EN) 145-1 through 145-M. The CT 110 and the ET 140 host the physical devices of the ET and CT, respectively. The CNs and ENs 145 are typically virtualized using traditional models for cloud and edge virtualization. The CNs and ENs 145 have properties such as processing speed, total memory, bandwidth and geographical location. However, there are some important differences between the CNs and ENs 145. ENs 145, for example, are typically less powerful devices than CNs, regarding the resources available (e.g., memory capacity). In addition, the ENs 145 tend to be geographically closer to the data sources (for instance, sensors and IoT devices) than the CNs. Another difference is the centralized nature of the CNs at the Cloud tier 110, while the ENs 145 are typically decentralized entities and may leverage distributed and collaborative computing. The distributed nature and the proximity of the data sources make it possible to exploit context and location-awareness capabilities in the edge tier 140. Thus, instead of providing resources from a centralized and remote infrastructure, one can explore the provision of resources regionally distributed, either closer to the data source, the data consumer, or both. This feature has the potential to increase the efficiency of the usage of the infrastructure and the quality of the user experience with the services provided.

In one or more embodiments of the disclosed architecture, collaboration 148 among edge nodes and location-awareness features are actively promoted. The nodes in the edge tier 140 are grouped in a hierarchical fashion, with both vertical and horizontal communication/collaboration possible within the system. See, for example, R. Mahmud et al., "Fog Computing: A Taxonomy, Survey and Future Directions," Internet of Everything, 103-130 (Springer, Singapore, 2018), incorporated by reference herein in its entirety. To reach this goal, the ET 140 is divided into groups of ENs 145 (with a master node and slave nodes in each group of ENs 145) in some embodiments using a space splitting algorithm using location and available resources information. In at least one embodiment, such an algorithm can leverage information from the Weighted Voronoi Diagram (WVD). See, for example, M. Inaba et al., "Applications of Weighted Voronoi Diagrams and Randomization to Variance-Based k-Clustering," Proc. of the $10^{th}$ Annual Symposium on Computational Geometry, ACM, 332-339 (1994), incorporated by reference herein in its entirety. Then, each group is organized in a hierarchical structure using another appropriate algorithm. In some embodiments, this algorithm may use information about the graph or sub-graphs generated by splitting the space into regions.

In the hierarchy of FIG. 1, the master nodes (e.g., master edge nodes 145-2 and 145-4) in each group of ENs 145 are responsible for engaging slave edge nodes 145 to serve an application request. In one or more embodiments, the master edge nodes 145-2 and 145-4 are organized in a neighborhood in order to enable the collaboration 148 among the master edge nodes. Thus, the master edge nodes 145-2 and 145-4 can perform a collaboration process 148 with each other to identify a group of edge nodes 145 that can serve the application request. With such hierarchical and geographical organization of the nodes 145, it is possible (i) to facilitate the collaboration 148 between the edge nodes 145, and (ii) to assign physical nodes (at the Sensor Tier 170) to edge nodes 145 that are closer to the physical nodes, thus minimizing the consumption of resources with data and control messages, since communications are within a limited geographic region.

Finally, the ST 170 encompasses a plurality of constrained end devices 175-1 through 175-N (e.g., sensors and other IoT devices or groups of such sensors and other IoT devices) deployed over a geographic area comprising the data sources for the edge-cloud system. Each end device 175 is typically heterogeneous regarding processing speed, total memory, and energy capacity. In addition, end devices 175 in the ST 170 can provide sensing data and/or performing actuation tasks over a region. Examples of grouped devices are wireless sensors grouped to compose Wireless Sensor and Actuator Networks (WSANs) (e.g., 175-2 and 175-N), and smart devices such as smart phones and smartwatches.

In the considered architecture, at least one CN is assumed to be responsible for hosting a Virtual Node Service Delivery (VNSD) 120. The exemplary VNSD 120 is an entry point to receive user requests. Also, the CN hosting the VNSD 120 is responsible in some embodiments for hosting a centralized version of the disclosed Resource Allocation process. The edge nodes 145 provide computational units organized in two sub-systems, namely, a Virtualization Sub-system Manager (VSM) 150 and a Virtual Node sub-system (VNS) 160. In the embodiment of FIG. 1, the VSM 150 encompasses a resource allocation manager (ResourceAllocationMgr) 152, a resource provisioning manager (ResourceProvisioningMgr) 154, a virtual node instance manager (VNInstanceMgr) (VNIR) 156, a VNSD 158 and a registries repository manager (RegistriesRepositoryMgr) 159, whereas the exemplary VNS 160 includes a Virtual Node Manager (VNM) 164, a Virtual Node 166 and a sensing and actuation manager (Sensing&ActuationMgr) 168. In some embodiments, units 164, 166 and 168 handle user requests by performing tasks to provide sensing data or perform actuations on the physical environment.

Figure 2:
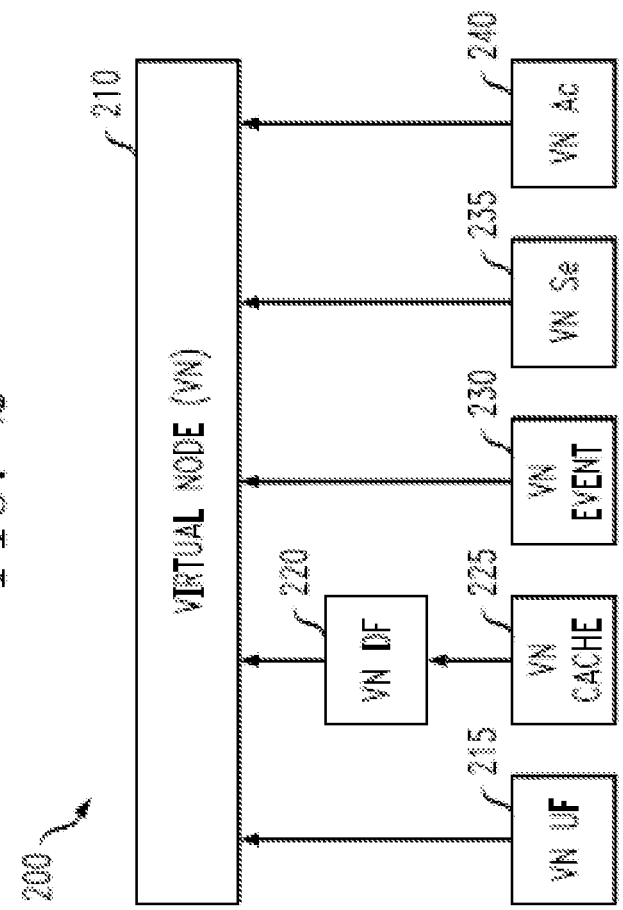
FIG. 2 illustrates an exemplary set of virtual node types for a virtual node in further detail, according to at least one embodiment.

As noted above, in some embodiments, six built-in, predefined types of virtual nodes are initially provided. FIG. 2 illustrates an exemplary set of virtual node types 200 for a virtual node 210 in further detail, according to at least one embodiment. As shown in FIG. 2, the exemplary types of VNs 200 comprise a VN for user functions (UFs) 215, a VN for data fusion (DF) 220 and a VN for caching (Ch) 225, a VN for events (Ev) 230, a VN for sensing (Se) 235, and a VN for actuation (Ac) 240, as discussed further below in the section entitled "Virtualization Model."

In one or more embodiments, each Data Type (DT) is considered to be unique, and several VNs can provide data of the same data type. Moreover, the output data of a VN is of a single data type. The Service Providers (SePs) define and describe the data types available in the system and provide them in a catalogue, or by other means. In some embodiments, the data type can be considered a non-negotiable requirement. Several VNs that provide the same data type are alternatives to meet a request. Data freshness, however, is a negotiable requirement. Ideally, each VN should update its data upon its allocation to each application request, in order to meet all requests with best (zero) data freshness. However, data updates require the VN to coordinate the engagement of the underlying physical sensor nodes, thus incurring a given processing load on it. Besides consuming energy and bandwidth resources, the execution of a data update procedure has a delay for meeting the request.

This delay is divided into two parts. The first delay is with respect to accomplishing a processing load necessary for data acquisition, and the respective time for completing this first part can vary as a function of the number of processors dedicated to the VN. The second delay is with respect to a fixed amount of time, during which the collection of data must occur.

For data types that describe a signal, or a multi-sample data, s is set to a sampling rate described by the data type t. There is a waiting time also described by the type t (or an equivalent number of samples at the given sampling rate) while several samples are collected in sequence. After this time, the data has maximum freshness (zero seconds). Then, a processing may occur to make the data ready within the VN, including, for example, filtering, parsing and insertion of this data in a database. Therefore, by the end of the data update procedure, the data freshness will have been delayed. Both the processing due to the output data type and the request procedure incur delays.

It is noted that since the exemplary lightweight data-centric model is built for extensibility, new data types can be defined and incorporated in the model, as would be apparent to a person of ordinary skill in the art. A new data type is created by extending an available virtual node super-class into the framework core library and template files to configure the data type.

The concept of virtualization is commonly adopted to hide heterogeneity and complexity of resources to be provided, thus facilitating their management and utilization. An important idea of virtualization in an edge-cloud system is to abstract away "physical resources," which can then be "composed" at a logical level to support usage by multiple independent users and even by multiple concurrent applications.

As with traditional cloud platforms, edge computing is also strongly built on the virtualization concept. However, virtualization of resources at the edge tier needs to follow a lighter and more flexible approach to meet the constraints and heterogeneity of devices and to exploit the specific features of these nodes.

Moreover, for emerging applications, such as IoT, besides processing, storage and bandwidth capacities, a valuable resource is the sensing data produced by the IoT devices. Therefore, first-order entities in a virtualization process are no longer just virtual machines and computational cores, but also sensing data (raw or in different processing states). An edge-cloud virtualization model that addresses such applications needs to take this data-driven nature into account as well.

To meet the requirements of being lightweight, the proposed virtualization model is based on microservices and container technology. More specifically, for the specification of the disclosed virtualization model, an approach is employed in some embodiments based on microservices (see, for example, J. Thones, "Microservices," IEEE Software 32.1, 116 (2015); and/or J. Lewis and M. Fowler, Microservices (Mar. 25, 2014), downloadable from martinfowler.com, each incorporated by reference herein in its entirety), and for the implementation of this model a container-based solution is adopted. See, for example, C. Pahl, and B. Lee, "Containers and Clusters for Edge Cloud Architectures—a Technology Review," 2015 3rd Int'l Conf. on Future Internet of Things and Cloud (FiCloud), 379-386, IEEE (August 2015); and/or B. I. Ismail et al., "Evaluation of Docker as Edge Computing Platform," 2015 IEEE Conf. on Open Systems (ICOS), 130-135, IEEE (August 2015), each incorporated by reference herein in its entirety.

Generally, microservices are small, highly decoupled applications, typically built for a single responsibility. They are independently deployable, scalable, and testable and they communicate with each other using well defined application programming interfaces (API). In turn, the container-based approach can be defined as a lightweight virtualization technology for packaging, delivering and orchestrating both software infrastructure services and applications, aiming at increasing interoperability and portability.

The motivation for using microservices in the context of this invention is to allow the development of independent and lightweight-components for running on the edge nodes. Containers are used herein to package such components in lightweight-images, thus facilitating their distribution and managing.

Moreover, another relevant feature of containers is facilitating their migration between computational nodes (e.g., in the context of this disclosure, between edge nodes). See, for example, T. Taleb et al., "Mobile Edge Computing Potential in Making Cities Smarter," IEEE Communications Magazine, 55(3), 38-43 (2017), incorporated by reference herein in its entirety. Component migration is an important feature for many applications, mainly in the presence of mobile nodes, since the edge nodes serving an application running in the mobile device may become too far to meet the required delay.

To meet the requirement of being data-oriented, and thus more tailored for IoT applications, in some embodiments, data is the core entity for creating the virtual nodes in the proposed virtualization model. As noted above, several types of virtual nodes are defined herein that represent data-driven resources to be provided by the edge-cloud infrastructure. Applications access the resources provided by our three-tier architecture through the virtualization model.

The virtual node (VN) 210 is a central element of the model. In the disclosed lightweight data-centric model, the VN 210 is a software instance providing data in response to application requests directly at the edge of the network. Also, the VN 210 is responsible for abstracting the computation and communication capabilities provided by a set of underlying nodes. Moreover, the VN 210 is optionally based on a microservice concept as it is small, high decoupled, and performs a single responsibility. Thus, each virtual node 210 is designed to implement one data type. Therefore, the disclosed model already provides predefined types of VNs for the data types provided.

A virtual node 210 is formally defined as a tuple VN=(RS, GL, NT), where RS represents the resource provided by the VN; GL=(longitude, latitude) is the geographic location of interest; and NT={UF, Se, Ac, DF, Ch, Ev} is the collection of VN types described above. Resources can be of a simple type, such as Temperature or a complex type, such as the description of an event of interest (such as Fire Detection, Fire Intrusion, Rain and Target Detected).

The VN 210 of type user function (UF) allows the user to inject code for performing custom operations (e.g., application specific) over data. The VN of type sensing (Se) provides a stream of raw data sensed from the physical environment and has a set of properties p: p=(fr, sr), where fr denotes the data freshness and sr the sampling data rate. The data stream can be retrieved from historical databases maintained at the edge tier 140 or by a direct connection with the physical nodes at the sensor tier 170. The data freshness (see, for example, M. Bouzeghoub, "A Framework for Analysis of Data Freshness," Proc. of the 2004 Int'l Workshop on Information Quality in Information Systems, 59-67, ACM (2004). incorporated by reference herein in its entirety) is an important requirement which a VN must verify during the processing of the request to determine the source of the data to send to the application. For instance, if the last data delivered is in a valid range time of data freshness, the VN 210 transmits the data obtained from the cache to the application. Otherwise, fresh data is obtained using the Sensing and Actuation sub-process before forwarding the data to the application. Hereafter, each type of VN is described.

The VN 240 of type actuation (Ac) provides actuation capabilities over the physical environment and has a set of properties p: p=(op, tx), where op denotes the type of actuation function provided by the VN and tx is the frequency that the actuation command must be performed by the system.

The VN 220 of type data fusion (DF) provides value-added information through the execution of queries using a Complex Event Processing (CEP) engine (see, e.g., Wikipedia page on "Complex Event Processing") and has a set of properties p: p=(af, sn), where af denotes an information/aggregation function and sn the number of samples to be used by af. This is a powerful type of VN 210 since it allows defining application-specific functions, domain-specific functions or generic event processing functions.

The VN 225 of type cache (Ch) is a subtype of DF that adds the capability of persisting the results of of in memory. The $VN^{ch}$ has a set of properties p: p=(ts), where ts denotes the timestamp of the execution of af (that produced the data cached by $VN^{ch}$). This VN 210 is important to avoid unnecessary use of resources of an EN when several requests are received for processing the same query using the same parameters.

Finally, the VN 230 of type event (Ev) aims to notify an application or another VN 210 whenever an event of interest occurs by using a publish/subscribe communication model. (See, e.g., Wikipedia page on "Publish Subscribe Patterns"; and/or S. Tarkoma, Publish/Subscribe Systems: Design and Principles, (John Wiley & Sons.; 2012, incorporated by reference herein in its entirety). $VN^{Ev}$ has a set of properties p: p=(rl), where rl denotes a rule to trigger the event.

The Resource Management activity in cloud computing typically encompasses the resource allocation and resource provisioning, among other activities. These are two important processes that aim to ensure the operational efficiency of the entire cloud system. Proper resource allocation improves overall performance of the system and avoids different kinds of bottlenecks, that could otherwise degrade performance of the running applications.

In this context, one or more embodiments provide improved techniques for resource management in edge-cloud systems. In some embodiments, the virtualization and the resource management processes are considered in an integrated manner. One or more aspects of the disclosure recognize that the efficient and cost-effective provisioning and allocation of such resources are intrinsically entangled with the virtualization process itself, since edge-cloud ecosystems essentially provide virtualized resources. Therefore, the disclosed resource management framework provides a set of components and respective activities for the instantiation of VNs that encompass, in some embodiments, the processes for (i) resource allocation, (ii) resource provisioning, (iii) management of sensing and actuation tasks (required for task scheduling), (v) data provisioning, and (vi) collaboration.

Figure 3:
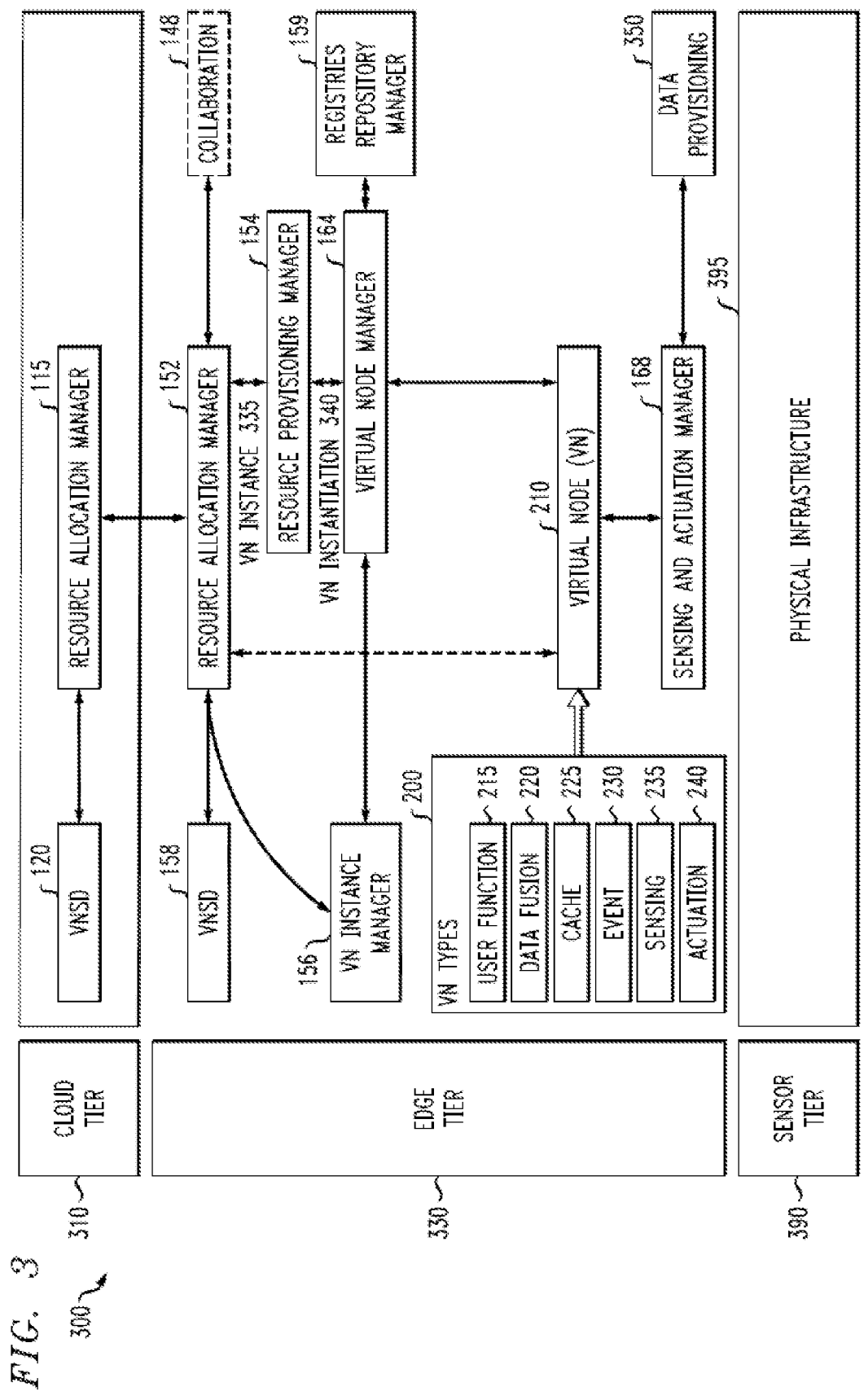
FIG. 3 illustrates an exemplary virtualization model, according to at least one embodiment of the disclosure.

FIG. 3 illustrates an exemplary virtualization model 300, according to at least one embodiment of the disclosure. As shown in FIG. 3, the exemplary virtualization model 300 comprises a cloud tier 310, an edge tier 330, and a sensor tier 390. The exemplary cloud tier 310 comprises a resource allocation manager 115 to manage a resource allocation function and a VNSD 120 as an entry point to receive user application requests.

The exemplary edge tier 330 comprises a VNSD 158 as an entry point to receive user application requests, a resource allocation manager 152 to manage the resource allocation function, and a resource provisioning manager 154 to manage a resource provisioning function. Generally, the resource allocation manager 152 allocates one or more VN instances 335 which are instantiated by the resource provisioning manager 154 as one or more VN instantiations 340.

As shown in FIG. 3, and as discussed above in conjunction with FIG. 2, the VN types 200, in some embodiments comprise VNs for user functions (UFs) 215, data fusion (Df) 220, cache (Ch) 225, events (Ev) 230, sensing (Se) 235, and actuation (Ac) 240.

End users submit their requests to the edge-cloud system using an API deployed at the Cloud or via an Edge node. The arriving requests are handled by the VNSD 120 and the resource allocation manager 115 responsible for implementing the resource allocation process. When requests arrive via the Cloud tier 310, for example, a centralized version of the resource allocation manager 115 is responsible for forwarding each request to the master edge node (EN) capable of processing the request. Upon receiving the requests, the resource allocation manager 152 executing in the EN must provide a VN instance 335 to meet such requests. To do so, the resource allocation manager 152 searches in its cache of VN instances and queries all available slave nodes for a VN 210 matching the received requests. When a matching VN 210 is found, the resource allocation manager 152 forwards the request for the VN 210 to execute the tasks, thus providing the requested data/event as an outcome. However, if a VN 210 is not found, or if the available VNs 210 are busy (with other, previously received requests), then the resource provisioning manager 154 is invoked to instantiate a new VN instantiation 340.

The resource provisioning manager 154 is the component in charge of executing the action to select and prepare the underlying physical infrastructure that is capable of hosting and running a VN instance 335 (e.g., a container) matching application requests. The action of selecting physical nodes that meet the requirements of data provisioning to compose a virtual node is a mapping function. See, for example, O. Skarlat et al., "Resource Provisioning for IoT Services in the Fog," 2016 IEEE 9th International Conference on Service-Oriented Computing and Applications (SOCA), Macau, 32-39 (2016); S. Misra et al., "On Theoretical Modeling of Sensor Cloud: A Paradigm Shift From Wireless Sensor Network," IEEE Systems Journal, Vol. 11, No. 2, 1084-1093 (June 2017); S. Chatterjee and S. Misra, "Optimal Composition of a Virtual Sensor for Efficient Virtualization within Sensor-Cloud," Proc. of IEEE International Conf. on Communications, 448-453 (June 2015); C. Roy et al., "DIVISOR: Dynamic Virtual Sensor Formation for Overlapping Region in IoT-based Sensor-Cloud," Proc. of the IEEE Wireless Communications and Networking Conf. (2018); and/or O. Skarlat et al., "Optimized IoT Service Placement in the Fog," Serv. Oriented Comput. Appl. 11, 4, 427-443 (December 2017), each incorporated by reference herein in its entirety.

In one or more embodiments, the exemplary resource management framework provisions a VN 210 using the resource provisioning manager 154 to invoke the VNM 164. In some embodiments, the VNM 164 is an auxiliary component in charge of instantiating 340 the appropriate VN type 200 to meet the application request, in addition to registering the new VN instance 335 into the instance repository with the VN instance manager 156. If the resource provisioning manager 154 cannot provide the necessary resources to instantiate 340 a VN 210, the following operational decisions are executed:

(i) if the EN is a slave node and the request has arrived directly by the VNSD 158 (entry-point), the request is forwarded to its respective master node;

(ii) if the EN is a master node and the request has arrived by the point of entry or forwarded by a slave node, the master node invokes the collaboration process 148 to find a neighbor node and then, forwards the request to the neighbor master node. Whenever the collaboration process 148 is not able to find a neighbor master node to meet the request, then the request is forwarded to the centralized resource allocation manager 115 in the Cloud tier 310.

In at least one embodiment, the collaboration process 148 is responsible for enabling the cooperative work and the division of the workload to meet an application request among the edge nodes. The collaboration process 148 is available (deployed) into all the edge nodes, but only the edge nodes classified into the hierarchy as master nodes are in charge of executing the collaboration process 148. Thus, the collaboration process 148 provides, for each master edge node, the capability of decision-making to engage neighboring master edge nodes to allocate or provision VNs 210, when necessary.

There is a lack of support for collaborative computation in edge-cloud systems. See, for example, R. Dautov et al., "Pushing Intelligence to the Edge with a Stream Processing Architecture," 2017 IEEE Int'l Conf. on Internet of Things (iThings) and IEEE Green Computing and Communications (GreenCom) and IEEE Cyber, Physical and Social Computing (CPSCom) and IEEE Smart Data (SmartData), 792-799 (Exeter, 2017), incorporated by reference herein in its entirety. That is, existing approaches do not seem to consider situations when multiple edge devices can collaborate to accomplish an intensive task by sharing the workload between them. In this sense, the disclosed resource management framework fills a research gap by providing mechanisms and building blocks to promote collaboration between edge nodes.

When a VN 210 receives a request from the resource allocation manager 152 to process, the VN 210 needs to use the services of the sensing and actuation manager 168. Generally, the sensing and actuation manager 168 implements the process that manages interactions between the VNs 210 and the physical infrastructure 395 in the sensor (data source) tier 390 (e.g., data provisioning 350). The sensing and actuation manager 168 is an independent component, in some embodiments, that substantially continuously obtains data/events from the physical devices in the physical infrastructure 395 and persists the data/events into a historical database maintained at the edge tier 330. The sensing and actuation manager 168 optionally abstracts the complexity of the VN 210 to deal with the highly heterogeneous devices in the physical infrastructure 395 that directly get data/perform actuations from/upon the physical environment. Therefore, the sensing and actuation manager 168 provides the services for the VN 210 to acquire sensing data and/or send actuation commands (depending on the VN type 200).

The data provided can be either preprocessed or unprocessed data. In one or more embodiments, unprocessed data is retrieved from historical databases or by directly accessing the physical nodes in the sensor tier 390 whenever fresh data is required. The processed data is provided by a CEP engine, discussed above for the VN 220 of type DF. Generally, the CEP engine is responsible for the execution of queries that make use of single or a set of raw data as input.

Furthermore, services of the exemplary sensing and actuation manager 168 that provide data to VNs 210 optionally make use of a data provisioning process. In some embodiments, the data provisioning process is responsible for abstracting the complexity of dealing with operations for the data collected from the physical devices in the sensor tier 390, data persistence, data update, data delete, and data retrieval in the historical databases.

Thus, the system architecture of edge nodes 145 considered in one or more embodiments is hierarchical and has two main types of nodes, namely, master nodes and slave nodes. Master edge nodes (e.g., 145-2) are responsible for managing the resource allocation process in some embodiments. In some embodiments of the disclosed hierarchical organization, one goal is to define which edge nodes 145 are master edge nodes according to two criteria: (i) edge nodes 145 that have a bigger amount of resources, and (ii) edge nodes 145 that reduce the distance between the other edge nodes and the cloud.

In order to reach the first criterion, the edge nodes 145 chosen as master nodes are those that have greater computational capacity and greater ability to communicate with the cloud. The computational capacity comprises the amount of resources that the edge node 145 has in terms of processing rate, amount of random-access memory (RAM), amount of permanent storage on hard disk and communication capacity, which corresponds to the data transmission speed of the link that connects the edge node 145 to the cloud tier 110.

The second criterion is achieved by means of the exemplary hierarchy algorithm described herein. This algorithm defines the position, in the hierarchy, of each of the edge slave nodes. With a fixed set of master nodes, determined as detailed in the previous paragraph, the algorithm determines the level in the hierarchy of each slave node in order to minimize the distance between slave edge nodes. Hierarchy level is an ordering value from a node to master node and is different from physical distance. A master node is in the first level, the neighbors of a node are in the second level and so on. This hierarchy determines communication of nodes, for example, nodes in the second level communicate with a master node or neighbor nodes from the third level. Establishing the hierarchy of edge nodes 145 considering the physical distance of the nodes solves the issue of propagation delay of signals through long distances. In some scenarios, the distance between two edge nodes 145 is on the order of kilometers. Thus, establishing a communication organization of the edge nodes 145 in order to reduce the distance traveled by the messages is necessary.

Users define their applications in some embodiments based on the data types available in the infrastructure, and providers serve user requests also based on data types. A data type can represent either raw data (a temperature value) acquired by a sensor, a time series of a sensed data, or even data resulting from some processing (an event or a data aggregation). Different kinds of IoT devices can produce different types of data. In the definition of a data type, besides the particular information regarding the type of the environmental variable itself, the sampling rate and amount of data that must be read to calculate the data type are also included. Finally, a data type can also specify an information fusion function that transforms the inputs into the final kind of data. For instance, a data type can be a sequence of ten readings of raw temperature values obtained in a specific position in a room of a building with a given sampling rate (with no processing information fusion function). As another example, a data type can be a set of processed images, through a specific function, from monitoring cameras in a parking lot at a given refresh rate (sampling rate).

The resource allocation algorithm connects the edge and IoT nodes to applications using the concept of data types. Consider that edge and IoT tiers are virtualized using the concept of VNs. In one or more embodiments, a VN is instantiated to provide data of a single data type. The VN, which is a software instance, implements the information fusion function and attributes of its provided data type.

Moreover, an application is a set of requests to data types. Requests can be dependent on each other, in terms of precedence, so an application can be modeled as a directed acyclic graph of requests. A request must be performed before another request (for the same application), when the data requested by the successor request requires the data of the preceding request as input. The data to meet such requests come from the Virtual Nodes (VNs), and the resource allocation algorithm, therefore, allocates VNs (resources) to meet the application requests.

Each request can arrive at an edge node 145 having as its origin a node of any other layer (cloud tier 110 or sensor tier 170). The requests coming from either the cloud tier 110 or sensor tier 170 are generated through applications of the users. Requests can also be passed from one edge node 145 to another edge node 145 in the edge tier 140, in case the original edge node 145 is not able to allocate the resources needed to meet the request.

In order to reduce the latency of requests, resource allocation can fulfill the requests in the Edge Tier. For this reason, edge nodes 145 that have connections between themselves perform horizontal collaboration, which means that a master edge node can send a request to another master node if the master edge node has not been able to allocate the request to any of its slave nodes, thereby allowing a larger portion of the Edge Tier to be used to allocate requests, promoting collaboration and better edge tier resource sharing.

Exemplary Definitions and Parameters

In one or more embodiments, an edge node $e_i$ is defined as a tuple $e_i = (C_{e_i}, M_{e_i}, S_{e_i}, \tau_{e_i}, D_{e_i})$, in which $C_{e_i}$ is the processing speed, $M_{e_i}$ is the total amount of memory available, $S_{e_i}$ is the total amount of storage of hard disk of edge node $e_i$, $\tau_{e_i} = \{MASTER, SLAVE\}$ is the type of edge node 145, and $D_{e_i}$ is a set of data types of the corresponding edge node 145. Capital letters are used for edge node information in order to distinguish the edge node information from the requirements of VNs. The definition of each data type $\delta_{e_{ik}} \in D_{e_i}$, k>0, is given by IoT devices connected to $e_i$. The edge tier 140 of edge nodes 145 is represented by a graph G=(E, L, d), in which E=($e_i \forall i \in 0 \ldots n$) is the set of n edge nodes, L={$(e_i, e_j) \forall i, j \in 1 \ldots n \wedge e_i, e_j \in E$} and d is a distance function between two edge nodes d:E×E→R. In at least one embodiment of the present disclosure, such distance function could be the Euclidean distance.

In some embodiments, each edge node 145 has a set of µ virtual nodes $V_{e_{ij}} = \{v_j \forall j \in 1 \ldots \mu \wedge i \in 0 \ldots n \vee e_i \in E\}$ and each virtual node is defined as a tuple $v_{e_{ij}} = (m_{e_{ij}}, s_{e_{ij}})$, in which $m_{e_{ij}}$ is the memory and $s_{e_{ij}}$ is the storage space in disk of edge node $e_i$ that are destined to virtual node j. The amount of memory and storage space designated to virtual nodes is limited by the amount of memory of the edge node 145, as described by expression (1):

$$\forall e_i \in E, \sum_{j=0}^{\mu} m_{e_{ij}} < M_{e_i} \wedge \sum_{j=0}^{\mu} s_{e_{ij}} < S_{e_i} \qquad (1)$$

A request is defined, in some embodiments, as a tuple $r_k = (I_{r_k}, m_{r_k}, s_{r_k}, \delta_{r_k}, p_{r_k})$, k>0, where $I_{r_k}$ is the quantity of instructions to be executed, $m_{r_k}$ is the amount of memory, $s_{r_k}$ is the storage space, $\delta_{r_k}$ is the data type of the request and $p_{r_k}$ is the priority of the request. In at least one embodiment of the present disclosure, the variable $p_{r_k}$ can be directly derived from the financial value paid by the user of the application that generated $r_k$. This value will be used in the utility market strategy of the VNs, as discussed further below, and this value aims to ensure that those users who wish to pay for a higher quality of service can be served properly. $p_{r_k}$ is determined by a set of categories that represent priority levels. This priority value is defined as $p_{r_k} \in \{\gamma_\alpha \vee \alpha \in N \Rightarrow \gamma_\alpha > \gamma_{\alpha+1}\}$, that is, $p_{r_k}$ is a element from a ordered set of priority values.

Market-Based Resource Allocation Algorithm

Among the several classifications of heuristic techniques shown in R. Marti and G. Reinelt, "Heuristic Methods," referenced above, an economic model inspired approach is used. This choice was made because economic theory was developed to solve problems of resource scarcity, which is similar to the case found at the Edge Tier. In a market economy, there are demands and offers of limited resources. Thus, some individuals want to obtain resources and other individuals provide these resources in a decentralized and efficient way.

One or more aspects of the present disclosure recognize that this model can be replicated at the Edge Tier to distribute resources from edge nodes 145 to meet demands of applications, where edge nodes 145 represent offers and applications represent demand. Each edge node 145 can be modelled as an economic agent that has resources to offer to applications and each application can be modelled as an economic agent that needs to get these resources.

One challenge to modelling an economic market in the edge tier is to define in an appropriate way the calculation of a value of a resource. In a market economy, a value of a resource (e.g., a product or service) is computed by agents, considering personal preferences and subjective evaluations. In the edge tier, however, the value of a given resource should be defined in an objective way, considering performance objectives of edge node networks, such as latency or energy, and constraints of applications.

In one or more embodiments, a new approach for determining the value of resources in the edge tier is provided, which considers a resource value as a utility function. This utility function is a relation of the cost to provide some resource and a price which the user (application) is disposed to pay to use that resource efficiently. The cost to provide a resource is calculated by each edge node 145 and takes into account performance metrics from a virtualization mechanism and network communications. The price paid by the user defines a priority value that determines how quickly an application will run. With this calculation of the resource value, a more homogeneous distribution of network resources from the edge tier and a priority of applications can be modelled. The following sections detail the steps of one or more embodiments of the disclosed Market-Based Resource Allocation Algorithm.

Figure 4:
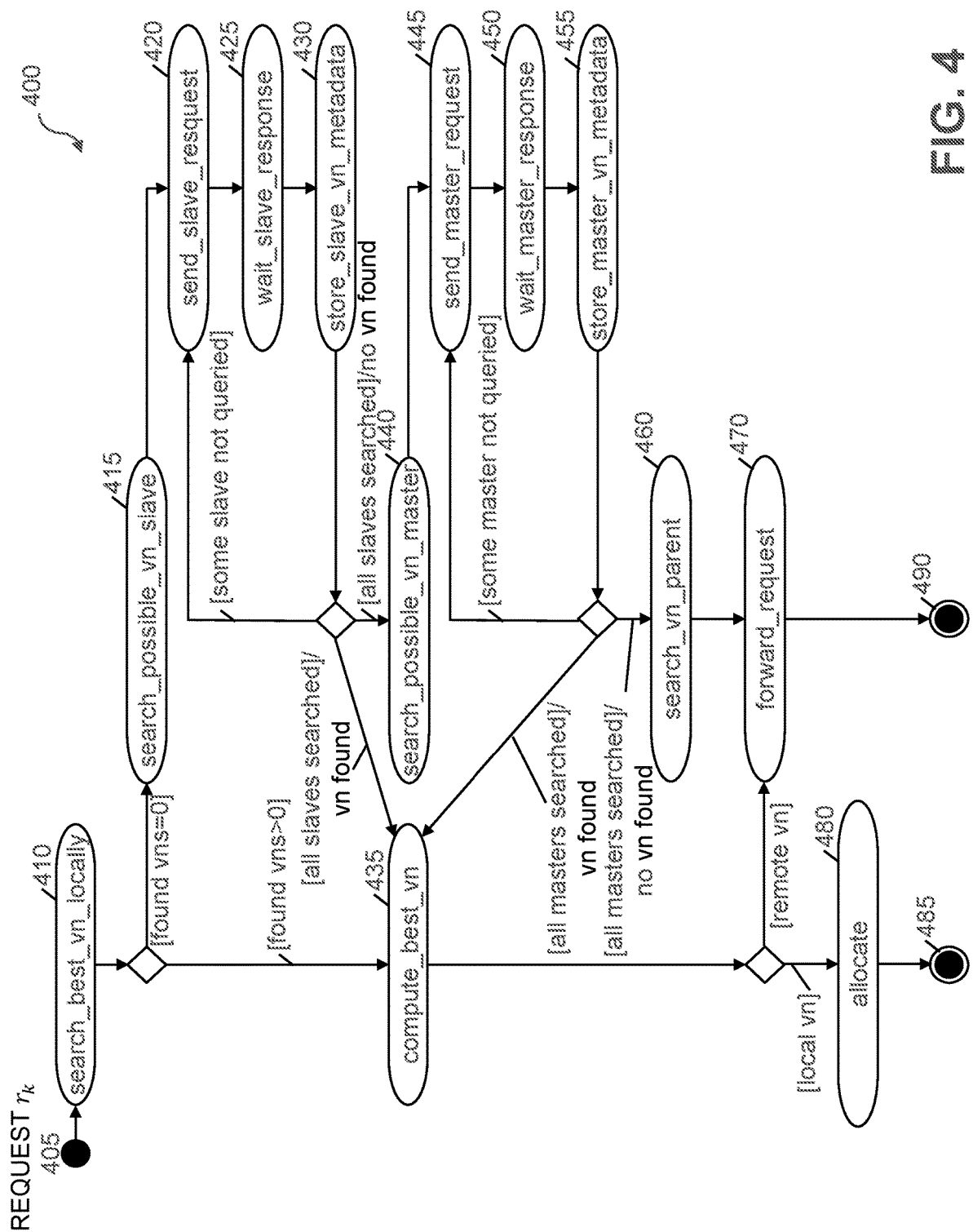
FIG. 4 is a Unified Modelling Language (UML) activity diagram illustrating an exemplary implementation of a market-based resource allocation process in one or more edge nodes, according to one embodiment.

FIG. 4 is a UML activity diagram illustrating an exemplary implementation of a market-based resource allocation process 400 in one or more edge nodes 145, according to one embodiment of the disclosure. The exemplary resource allocation process 400 determines where each application request sent to an IoT-Edge-Cloud system is served, by employing two mechanisms, a virtual node utility market, and a request forwarding process. Generally, when a request $r_k$ reaches an edge node $e_j$, the edge node 145 needs to determine locally, considering all VNs already instantiated and the possibility of instantiating a new VN, which is the most advantageous way to fulfill that request. To make this decision, the edge node 145 uses the utility value of the VN. This utility value is based on a priority value of the request and on a value representing the total cost that the processing of request $r_k$ by the respective VN can generate. If no VN pertaining to edge node $e_j$ can satisfy the request $r_k$, then a request forwarding mechanism is triggered to forward the request to another edge node.

As shown in FIG. 4, a request $r_k$ is received at an edge node 145 for activity 405. With the notation of FIG. 4, an initial activity (black circle) 405 occurs when a request arrives in the entry edge node 145 and a final activity (bordered black circle) 485, 490 occurs when the request is attended or the request goes out from the entry edge node 145, respectively. Each time a new request arrives in an edge node (the entry point node) 145, the sequence of activities in FIG. 4 is executed in a new thread of the system operation. After a request arrives (initial activity 405) in a given edge node 145, a "search_best_vn_locally" activity 410 is executed. This activity searches, in the local database of VNs hosted in the entry edge node 145, for a VN that is a substantially best match to attend to the arriving request. If no VN is found, then the "search_possible_vn_slave" activity 415 is executed; otherwise, if some VN is found, then the "compute_best_vn" activity 435 is called, as discussed further below.

The "search_possible_vn_slave" activity 415 searches for VNs on all slave nodes linked to the current edge node 145 if they exist (e.g., if the current node 145 is a master node). This search on slave nodes is made through three activities, namely a "send_slave_request" activity 420, a "wait_slave_response" activity 425, and a "store_slave_vn_metadata" activity 430. By executing such activities, the entry edge node 145 sends the request (in at least one embodiment, a request query representing such a request is created and sent), waits for a response and stores the meaningful parameters of the VN (e.g., VN metadata) in a temporary database. These three activities are repeated until all the slave neighbor nodes are queried. Once all the neighbor slaves nodes were queried, there are two possible outcomes: (i) if no VN was found, either because the current edge node 145 is itself a slave or because none of the slave nodes can fulfill the request, a "search_possible_vn_master" activity 440 is executed, (ii) otherwise, the "compute_best_vn" activity 435 is called.

The "search_possible_vn_master" activity 440 is similar to the "search_possible_vn_slave" activity 415, but the "search_possible_vn_master" activity 440 searches only in edge nodes 145 that are masters neighbors. If a slave node tries to execute this activity 440, the slave node will be redirected to executing the "search_vn_parent" method 460, discussed below. The "search_possible_vn_master" activity 440 also is followed by three activities of request sending ("send_master_request") 445, response waiting ("wait_master_response") 450, and VN metadata storing ("store_master_vn_metadata") 455, but these three activities are sent to neighbor masters nodes, instead of neighbor slaves nodes. If all masters neighbor nodes were queried and at least one VN was found, then the "compute_best_vn" activity 435 is called; otherwise, the "search_vn_parent" activity 460 is executed. This part of the execution process highlights the lateral collaboration of the disclosed algorithm.

The "compute_best_vn" activity 435 has the role of accessing a database of VNs and selecting the best VN to be allocated to the received request; such a selection is made through the disclosed market-based heuristic, which is based on an economic market of VNs. The database used by the "compute_best_vn" activity 435 is either the local virtual nodes database of the current edge node 145, if the previous activity is "search_best_vn_locally" 410, or a temporary VN database of neighbor slave nodes or neighbor masters nodes, if the previous activity is "search_best_vn_slave" or "search_best_vn_master," respectively. If some local VN is selected as the best VN, then an "allocate" activity 480 is executed, which allocates such chosen VN to the request, otherwise, a "forward_request" activity 470 is called.

A "search_vn_parent" activity 460 checks what is the parent node of the current edge node 145. A parent node can be another edge node, whenever the current edge node 145 is a slave node, or the cloud, when the current edge node 145 is a master node. After that, the "forward_request" activity 470 is called to send the request to an edge node 145 or to the cloud. When the previous activity is "compute_best_vn" 435, request forwarding is made to an edge node 145, which has the best VN previously chosen. In the last case, the request will be forwarded to the cloud and it is assumed that the cloud can fulfill any received request (at the cost of an increasing delay).

FIG. 5 illustrates pseudo code 500 for an exemplary implementation of the market-based resource allocation process 400 of FIG. 4, according to one or more embodiments of the disclosure. When a request $r_k$ arrives, function "search_best_vn_locally" is called (line 5) to search locally for a virtual node to attend to the request (lines 7-8). If no virtual node can be allocated to the request, then slave nodes are queried in function "search_possible_vn_slave" (line 10) and the request is forwarded (line 12) to the best virtual node of some slave node. In the case that the request arrived to a master node (line 1,4) and also no slave node could fulfill the request, a horizontal collaboration is performed (lines 15-17). Thus, the request is forwarded to another master node (line 17) and the new master node will try to allocate the request to the best virtual node from the sub-tree of the new master node. Finally, if a request arrives to a non-master node, or no slave node can fulfill the request, a vertical collaboration occurs, in which the node that received the request forwards the request to its neighbor node(s) with a higher level in the hierarchy (lines 23-24). This forwarding is made through the "search_slave_vn_parent" function. When a virtual node ends to attend to the request, the virtual node interrupts the edge node (line 29) which update its resources, releasing resources to attend to new requests (line 31).

Virtual Nodes Utility Market

As discussed above in conjunction with FIGS. 4 and 5, when a request $r_k$ arrives at an edge node $e_i$, the edge node 145 decides whether $r_k$ will be served locally or at another edge node 145, in which case the request forwarding mechanism will be triggered. This initial decision is made based on the computational capacity of the node and the type of requests that the node is able to handle. Computational capacity refers to the processor speed $C_{e_i}$, the amount of available memory $M_{e_i}$ and the amount of available storage $S_{e_i}$. The types of possible requests to be met are limited by the set of data types $D_{e_i}$ that the edge node $e_i$ has. The following restrictions (2), (3) and (4) must be observed:

$$m_{r_i} < M_{e_i} - \Sigma_{j=0}^{\mu} m_{e_{ij}}; \tag{2}$$

$$s_{r_i} < S_{e_i} - \Sigma_{j=0}^{\mu} s_{e_{ij}}; \text{ and} \tag{3}$$

$$\delta_{r_k} \in D_{e_i}. \tag{4}$$

Equations (2) and (3) ensure that the edge node has sufficient memory and storage resources, respectively, to satisfy $r_k$, and Equation (4) ensures that the edge node 145 has the data type of the request. If at least one of these constraints is not valid, then the request forwarding mechanism is triggered (e.g., activity 470) to forward the request to another edge node 145. If the constraints are valid, then the edge node 145 locally computes the best VN to meet $r_k$ (activity 435).

The disclosed VN utility market strategy considers the current configuration of VNs on the edge node 145 to choose which $v_{e_{ij}}$ will be allocated to meet the request. This strategy calculates a utility value for each VN $$u_{v_{e_{ik}}}$$

as in Equation (5):

$$u_{v_{e_{ij}}} = 1/p_{r_k} * C(v_{e_{ij}}). \tag{5}$$

In Equation (5), $p_{r_k}$ is a value obtained through the request, which represents the priority of execution of the request and $C(v_{e_{ij}})$ is a total cost value of $v_{e_{ij}}$ meeting the request $r_k$. The virtual node with the highest utility value is chosen to satisfy $r_k$. The function $C(v_{e_{ij}})$ returns the cost of $v_{e_{ij}}$ meeting $r_k$. The function $C(v_{e_{ij}})$ is computed as the sum of six costs due to meeting the request by the virtual node and is defined per Equation (6).

$$C(v_{e_{ij}}) = C_r(v_{e_{ij}}) + C_i(e_i) + C_p(v_{e_{ij}}) + C_u(v_{e_{ij}}) + C_t(v_{e_{ij}}) + C_q(v_{e_{ij}}) \tag{6}$$

The cost functions that compose $C(v_{e_{ij}})$ in one or more exemplary embodiments are: a reconfiguration cost $C_r(v_{e_{ij}})$ (e.g., the cost of reconfiguring $v_{e_{ij}}$ when it is already instantiated), an instantiation cost $C_i(e_i)$, a processing cost $C_p(v_{e_{ij}})$, an update cost $C_u(v_{e_{ij}})$, a transmission cost $C_t(v_{e_{ij}})$, and a queue cost $C_q(v_{e_{ij}})$, and reconfiguration cost $C_r(v_{e_{ij}})$, which corresponds to the cost of reconfiguring $v_{e_{ij}}$ when it is already instantiated. When a request arrives at the edge node 145, the edge node 145 needs to choose the VN that will serve the request.

If the chosen VN is already instantiated, but the resources requested are greater than the resources available in the VN, it is necessary to reconfigure the amount of memory $m_{e_{ij}}$ and the storage space $s_{e_{ij}}$. Reconfiguring a VN can be more advantageous than instantiating a new VN. The cost of reconfiguration is then defined, for example, as in Equation (7):

$$C_r(v_{e_{ij}}) = \begin{cases} 0, & \text{if } v_{e_{ij}} \text{ is not instantiated;} \\ 0, & \text{if } v_{e_{ij}} \text{ is instantiated} \wedge \text{reconfiguration is not needed;} \\ T_r(e_i), & \text{if } v_{e_{ij}} \text{ is instantiated} \wedge \text{reconfiguration is needed.} \end{cases} \tag{7}$$

In Equation (7), $T_r(e_i)$ is the reconfiguration time of a virtual node in $e_i$, which is calculated as the average time that a virtual node takes to be instantiated in the edge node $e_i$.

$C_i(e_i)$ is the cost of instantiating a new VN. When a request arrives, the edge node 145 calculates the cost of possibly instantiating a VN if none of the other VNs can be used to serve the request. The instantiation cost is then defined, for example, as in Equation (8):

$$C_i(e_i) = \begin{cases} 0, & \text{if new VN does not need to be instantiated;} \\ T_i(e_i), & \text{if new VN needs to be instantiated on edge node } e_i. \end{cases} \tag{8}$$

In Equation (8), $T(e_i)$ is the average instantiation time of a VN in edge node $e_i$.

$C_p(v_{e_{ij}})$ is the cost of processing the request in VN $v_{e_{ij}}$. $C_p$ corresponds to the time it takes for all request instructions to be processed and is defined, for example, as in Equation (9):

$$C_p(v_{e_{ij}}) = C_{e_i} * I_{r_k}. \quad (9)$$

In Equation (9), $C_{e_i}$ is the processing rate of the edge node $e_i$ that has the virtual node $v_{e_{ij}}$ and $I_{r_k}$ is the quantity of instructions of the request $r_k$.

$C_u(v_{e_{ij}})$ is the cost of updating the VN data. When allocating a request to a virtual node, the edge node 145 checks if the request data is updated. If the data is not updated, $C_u(v_{e_{ij}})=0$, if the data is updated, then this cost corresponds to the time required to update the data. Thus, $C_u(v_{e_{ij}})$ is defined, for example, as in Equation (10):

$$C_u(v_{e_i}) = \frac{u(\delta_{r_k})}{c_{e_i}} \tau(\delta_{r_k}). \quad (10)$$

In Equation (10), $u_{\delta_k}$ is the function load of the data type, $c_{e_i}$ is the processing rate of $e_i$ and $\tau(\delta_{r_k})$ is the update time of the data type $\delta_{r_k}$.

$C_t(v_{e_{ij}})$ is the cost of data transmission during the meeting of the request. It is defined, for example, as in Equation (11):

$$C_t(v_{e_{ij}}) = \tau_{AEP \to v_{e_i}} + \tau_{v_{e_i} \to v_{e_j}} + \tau_{v_{e_j} \to AEP}. \quad (11)$$

In one or more embodiments, requests arrive through Application Entry Points (AEPs). AEP is a network mechanism from an edge node 145 which controls arrival and output of requests. In Equation (11), $$\tau_{AEP \to v_{e_i}}$$

is the time between the request arrival (from network) in AEP and VN to get a warning from AEP indicating a new request is in its queue. $\tau_{v_{e_j} \to AEP}$ is time interval between the request receiving in AEP and the moment when AEP notifies VN that request was fully transmitted.

$C_q(v_{e_{ij}})$ is the average queue time that a request waits to be answered by a virtual node. The goal of using this cost is to prevent requests from being forwarded to virtual nodes that have large queues of requests. This queue cost is calculated, for example, as in Equation (12):

$$C_q(v_{e_{ij}}) = \frac{1}{m} \sum_{k=0}^{m} T_f(v_{ij}, r_k) - T_0(v_{ij}, r_k). \quad (12)$$

In Equation (12), $T_0(v_{ij}, r_k)$ and $T_f(v_{ij}, r_k)$ are, respectively, the initial and final time from the moment the request arrives at the AEP of the VN until the moment in which it is attended.

Request Forwarding Mechanism

When a request arrives on an edge node 145, the edge node 145 may not be able to serve the request, either because the edge node 145 does not have sufficient spare resources, or because the data types of the edge node 145 do not match the requested data type. In this case, the edge node 145 will forward the request to one of its neighbor nodes 145. Initially, the edge node $e_i$ forwards a query to each of its neighbor nodes that are at a lower level in the hierarchy. Upon receiving this query, each node 145 returns to edge node $e_i$ its utility value of the best way of serving the request, either by using one existing VN locally deployed or by instantiating a new one, and edge node $e_i$ forwards the request to the neighbor that can provide the highest utility value.

If no neighbor is able to meet the request and $e_i$ is a master node, then horizontal collaboration 148 is performed, in at least some embodiments. Horizontal collaboration 148 means that $e_i$ sends the request query to any master node that has a connection to it. This horizontal collaboration 148 operation allows a search in another sub-tree of the tier edge G graph, which gives more opportunities for the request to be allocated in some edge node 145. Only if after this horizontal collaboration 148 no edge node 145 is able to allocate the request, then the request is forwarded to the cloud.

If the edge node 145 searches its neighbors, but no neighbor node is able to meet the request, and the edge node 145 is a slave node, then vertical collaboration occurs. In this case, the node sends the request to its parent node in the hierarchy and this process continues until this request is allocated (activity 480) or until the request reaches a master node. Upon reaching a master edge node, horizontal collaboration 148 is initiated, or the request is sent to the cloud.

Figure 6:
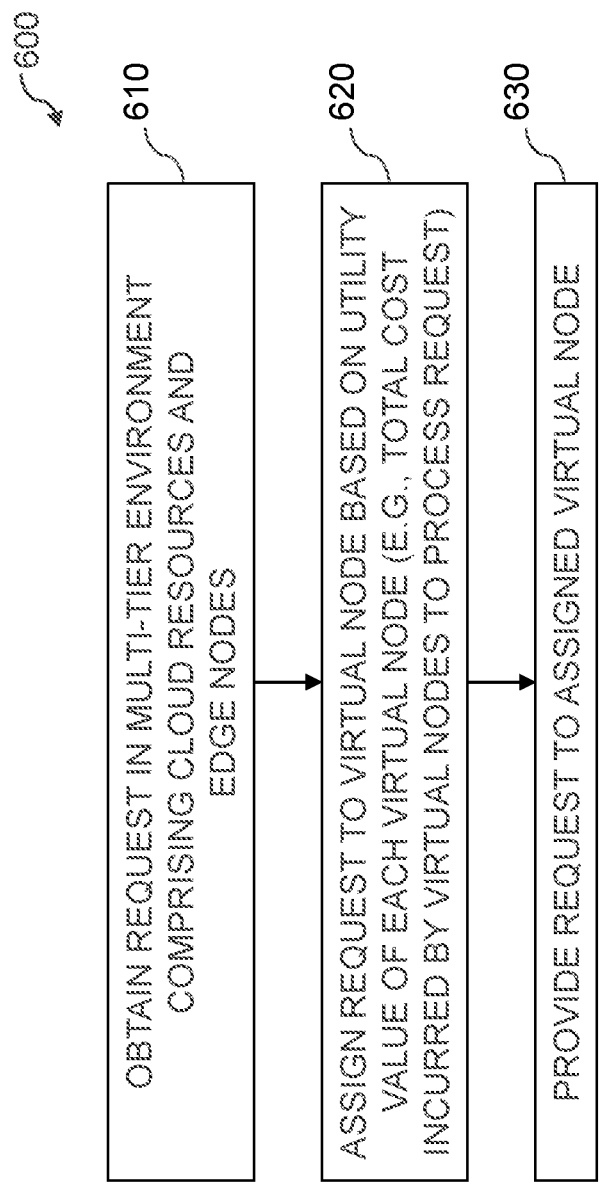
FIG. 6 is a flow chart illustrating an exemplary implementation of a market-based resource allocation process, according to at least one embodiment of the disclosure.

FIG. 6 is a flow chart illustrating an exemplary implementation of a market-based resource allocation process 600, according to at least one embodiment of the disclosure. As shown in FIG. 6, the exemplary market-based resource allocation process 600 initially obtains at least one application request at a given edge node in a multi-tier environment comprising one or more cloud resources and a plurality of edge nodes including the given edge node during step 610. As noted above, the edge nodes host a plurality of virtual nodes to process the at least one application request.

Thereafter, the exemplary market-based resource allocation process 600 assigns the request to a virtual node during step 620 based on a utility value of each virtual node. The utility value of each virtual node is based on a cost value representing a total cost incurred by each virtual node to process the at least one request.

Finally, the exemplary market-based resource allocation process 600 provides the request to the assigned virtual node based on the assigning during step 630. The assigned virtual node provides data in response to the request to corresponding applications and/or one or more additional virtual nodes.

One or more embodiments of the present disclosure solve the challenges derived from the complexity of the allocation problem in edge-cloud systems. In some embodiments, the disclosed algorithm is inspired by market economics and considers the fact that the physical infrastructure has limited resources to supply to applications. This scarcity of resources (mainly of edge nodes) is modeled as an economic scarcity problem by the exemplary algorithm. Such algorithm also uses the underlying architecture to tackle the issue of response time, which is particularly critical in IoT-edge-cloud systems. The topology of the edge nodes is organized according to the distance function calculated from all edge nodes to all other edge nodes. The mechanism for forwarding requests of the algorithm uses this organization to choose nodes closer to the source of the request. The orchestration of resources and the requests forwarding mechanism allow the algorithm to handle the trade-off between load balance and performance (response time) in a natural way. Furthermore, because there are constraints to be considered, the algorithm makes a robust choice for each application by respecting its necessities while also providing the best load balance possible among physical nodes.

In addition, some embodiments of the present disclosure solve the challenge derived from the scale and heterogeneity of IoT-Edge-Cloud systems. Because of the exemplary hierarchy created between edge nodes, heavier requests can be handled by bulkier edge devices on top of the small cluster, thus exploiting the heterogeneity among the nodes. This relaxes the necessity of moving some of the requests to the cloud tier and makes possible to handle heavier computation with strict latency restrictions. Further, the same hierarchy permits edge nodes at the same level to share requests with other nodes if a given edge node is not able to fulfill a given request at a given time. This feature enhances usage of the infrastructure, and also has the effect of moving less requests to the cloud. The horizontal collaboration approach also intrinsically helps increase the fault tolerance of the system.

In one or more embodiments, the disclosed resource allocation algorithm substantially simultaneously considers the response time and data freshness requirements in its formulation. In addition, the disclosed resource allocation algorithm allows different values of priorities to be defined for different applications, in order to allow the allocation of more resources to applications with a higher degree of criticality, thus properly accommodating the heterogeneous requirements of applications in a complex IoT-edge-cloud ecosystem.

One or more embodiments of the disclosure provide improved methods, apparatus and computer program products for market-based distributed resource allocation for edge-cloud systems. The foregoing applications and associated embodiments should be considered as illustrative only, and numerous other embodiments can be configured using the techniques disclosed herein, in a wide variety of different applications.

It should also be understood that the disclosed market-based distributed resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for market-based distributed resource allocation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
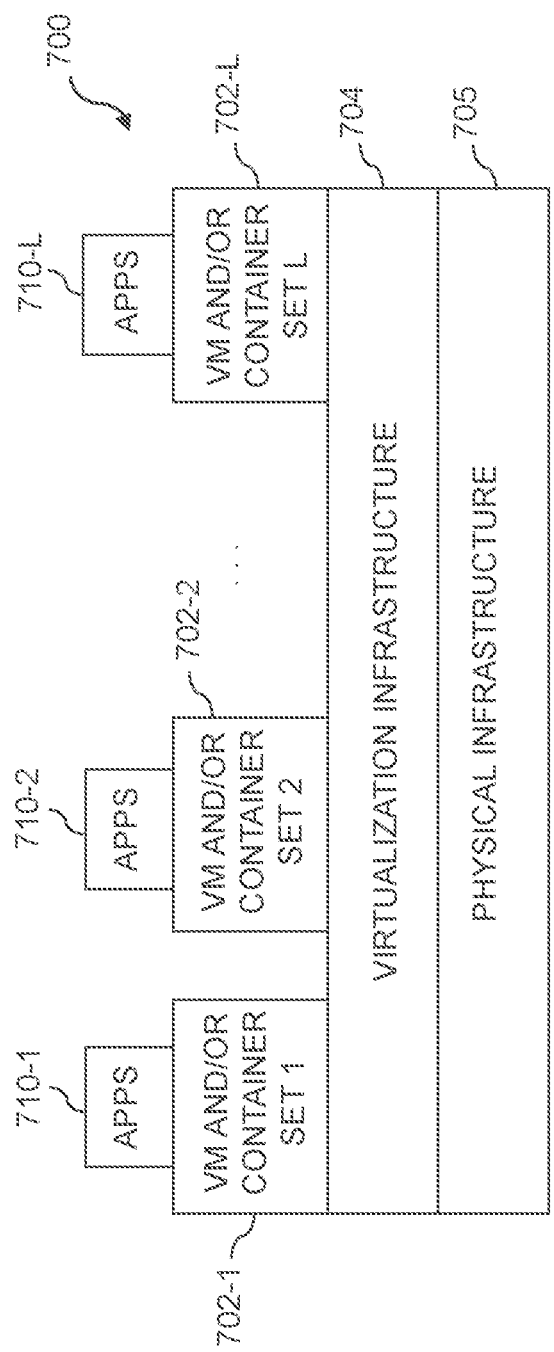
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of an information processing system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide market-based distributed resource allocation functionality of the type described above for one or more processes running on a given one of the VMs. For example, each of the VMs can implement market-based distributed resource allocation control logic and associated utility cost tables for providing market-based distributed resource allocation functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide market-based distributed resource allocation functionality of the type described above for one or more processes running on different ones of the containers. For example, a container host device supporting multiple containers of one or more container sets can implement one or more instances of market-based distributed resource allocation control logic and associated utility cost tables for use in performing market-based resource allocation.

As is apparent from the above, one or more of the processing modules or other components of the disclosed resource allocation system may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
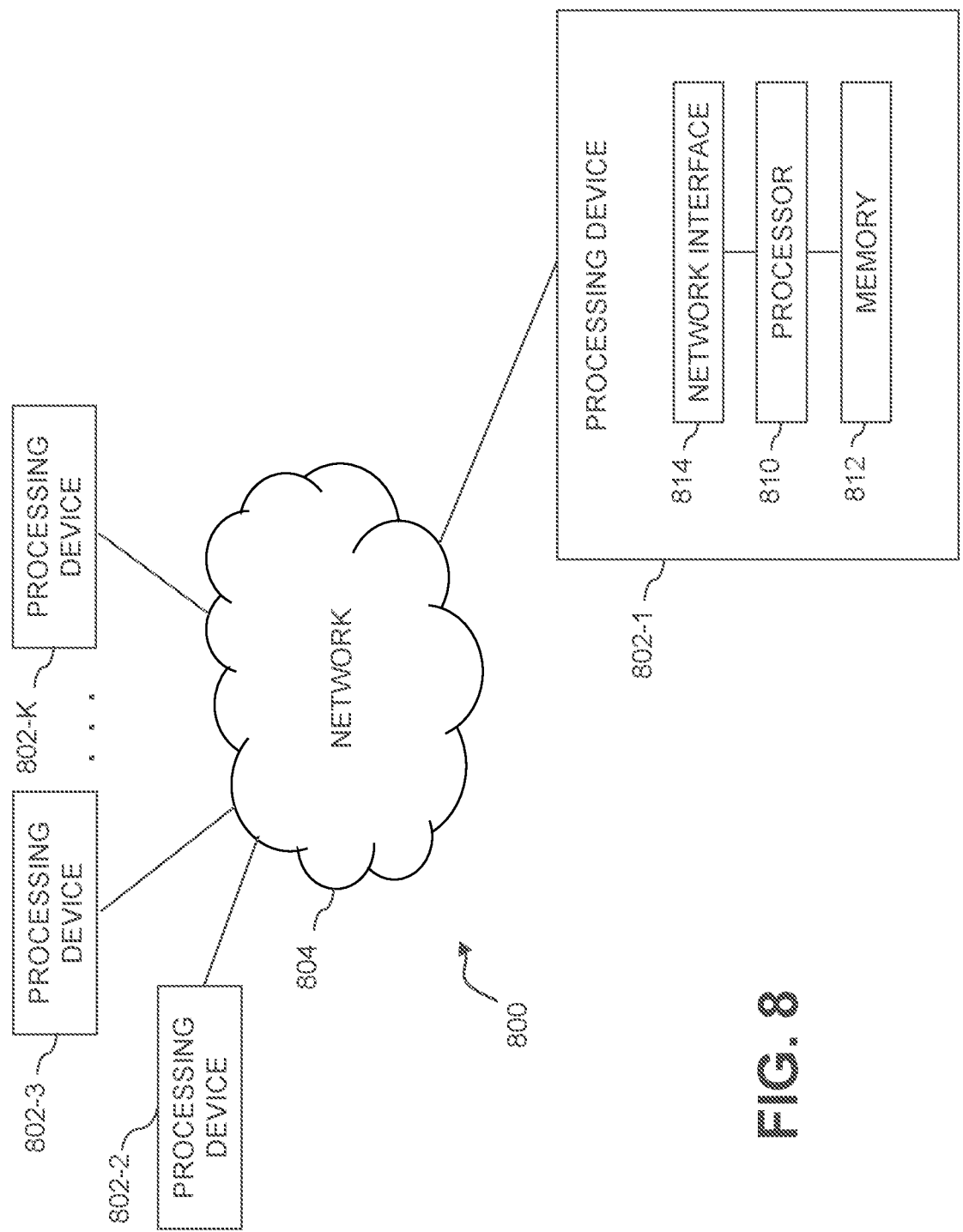
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining at least one application request at a given edge node in a multi-tier environment comprising one or more cloud resources and a plurality of edge nodes including the given edge node, wherein the plurality of edge nodes host a plurality of virtual nodes to process the at least one application request, and wherein each of the plurality of virtual nodes generates output data of a single data type of a plurality of data types employed in the multi-tier environment and corresponds to a given one of a plurality of virtual node types;
    assigning, using at least one processing device, the at least one application request to at least one of the plurality of virtual nodes of the given edge node based on a utility value of each of the virtual nodes, wherein the utility value of each virtual node of the given edge node is computed by the given edge node based at least in part on a cost value representing a total cost incurred by the respective virtual node of the given edge node to process the at least one application request, wherein the total cost incurred by the respective virtual node to process the at least one application request comprises an amount of resources needed by the respective virtual node to process the at least one application request; and
    providing, using the at least one processing device, the at least one application request to the at least one virtual node of the given edge node based on the assigning, wherein the at least one virtual node provides data in response to the at least one application request to one or more of: at least one corresponding application and one or more additional virtual nodes.

2. The method of claim 1, wherein the utility value of each virtual node is further based on a priority value of the at least one application request.

3. The method of claim 1, wherein the assigning is further based on a data type of the given application request and the virtual node type of the at least one virtual node.

4. The method of claim 1, wherein the cost value is based on one or more of a reconfiguration cost, an instantiation cost, a processing cost, an update cost, a transmission cost, and a queue cost.

5. The method of claim 1, further comprising forwarding the at least one application request to at least one different edge node if the given edge node does not satisfy the at least one application request.

6. The method of claim 5, wherein the at least one different edge node comprises a neighbor node of the given edge node.

7. The method of claim 5, wherein each of the at least one different edge node returns a corresponding utility value to the given edge node, and wherein the given edge node forwards the at least one application request to the different edge node having a substantially highest utility value.

8. The method of claim 5, wherein the edge nodes are grouped into a plurality of edge node groups and wherein each edge node group comprises at least one master node, and wherein at least two master nodes from different edge node groups collaborate to identify a given edge node group that can serve the at least one application request when each of the at least one different edge node is unable to process the at least one application request.

9. A computer program product, comprising a tangible machine-readable storage medium having encoded therein executable code of one or more software programs, wherein the one or more software programs when executed by at least one processing device perform the following steps:
    obtaining at least one application request at a given edge node in a multi-tier environment comprising one or more cloud resources and a plurality of edge nodes including the given edge node, wherein the plurality of edge nodes host a plurality of virtual nodes to process the at least one application request, and wherein each of the plurality of virtual nodes generates output data of a single data type of a plurality of data types employed in the multi-tier environment and corresponds to a given one of a plurality of virtual node types;
    assigning the at least one application request to at least one of the plurality of virtual nodes of the given edge node based on a utility value of each of the virtual nodes, wherein the utility value of each virtual node of the given edge node is computed by the given edge node based at least in part on a cost value representing a total cost incurred by the respective virtual node of the given edge node to process the at least one application request, wherein the total cost incurred by the respective virtual node to process the at least one application request comprises an amount of resources needed by the respective virtual node to process the at least one application request; and
    providing the at least one application request to the at least one virtual node of the given edge node based on the assigning, wherein the at least one virtual node provides data in response to the at least one application request to one or more of: at least one corresponding application and one or more additional virtual nodes.

10. The computer program product of claim 9, wherein the utility value of each virtual node is further based on a priority value of the at least one application request.

11. The computer program product of claim 9, wherein the assigning is further based on a data type of the given application request and the virtual node type of the at least one virtual node.

12. The computer program product of claim 9, further comprising the step of forwarding the at least one application request to at least one different edge node if the given edge node does not satisfy the at least one application request.

13. The computer program product of claim 12, wherein each of the at least one different edge node returns a corresponding utility value to the given edge node, and wherein the given edge node forwards the at least one application request to the different edge node having a substantially highest utility value.

14. The computer program product of claim 12, wherein the edge nodes are grouped into a plurality of edge node groups and wherein each edge node group comprises at least one master node, and wherein at least two master nodes from different edge node groups collaborate to identify a given edge node group that can serve the at least one application request when each of the at least one different edge node is unable to process the at least one application request.

15. An apparatus, comprising:
a memory; and
at least one processing device, coupled to the memory, operative to implement the following steps:
obtaining at least one application request at a given edge node in a multi-tier environment comprising one or more cloud resources and a plurality of edge nodes including the given edge node, wherein the plurality of edge nodes host a plurality of virtual nodes to process the at least one application request, and wherein each of the plurality of virtual nodes generates output data of a single data type of a plurality of data types employed in the multi-tier environment and corresponds to a given one of a plurality of virtual node types;
assigning the at least one application request to at least one of the plurality of virtual nodes of the given edge node based on a utility value of each of the virtual nodes, wherein the utility value of each virtual node of the given edge node is computed by the given edge node based at least in part on a cost value representing a total cost incurred by the respective virtual node of the given edge node to process the at least one application request, wherein the total cost incurred by the respective virtual node to process the at least one application request comprises an amount of resources needed by the respective virtual node to process the at least one application request; and
providing the at least one application request to the at least one virtual node of the given edge node based on the assigning, wherein the at least one virtual node provides data in response to the at least one application request to one or more of: at least one corresponding application and one or more additional virtual nodes.

16. The apparatus of claim 15, wherein the utility value of each virtual node is further based on a priority value of the at least one application request.

17. The apparatus of claim 15, wherein the assigning is further based on a data type of the given application request and the virtual node type of the at least one virtual node.

18. The apparatus of claim 15, further comprising the step of forwarding the at least one application request to at least one different edge node if the given edge node does not satisfy the at least one application request.

19. The apparatus of claim 18, wherein each of the at least one different edge node returns a corresponding utility value to the given edge node, and wherein the given edge node forwards the at least one application request to the different edge node having a substantially highest utility value.

20. The apparatus of claim 18, wherein the edge nodes are grouped into a plurality of edge node groups and wherein each edge node group comprises at least one master node, and wherein at least two master nodes from different edge node groups collaborate to identify a given edge node group that can serve the at least one application request when each of the at least one different edge node is unable to process the at least one application request.

* * * * *